United States Patent
Feng et al.

(10) Patent No.: US 12,367,182 B2
(45) Date of Patent: Jul. 22, 2025

(54) TRANSACTION VERIFICATION OF A TRANSACTION BASED ON A BLOCKCHAIN NETWORK

(71) Applicant: Tencent Technology (Shenzhen) Company Limited, Guangdong (CN)

(72) Inventors: Haoming Feng, Shenzhen (CN); Haitao Tu, Shenzhen (CN); Libao He, Shenzhen (CN); Qiuping Chen, Shenzhen (CN); Jiabao Chen, Shenzhen (CN); Peng Ren, Shenzhen (CN); Shuiping Zhou, Shenzhen (CN); Yong Zhao, Shenzhen (CN); He Wang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 212 days.

(21) Appl. No.: 18/071,934

(22) Filed: Nov. 30, 2022

(65) Prior Publication Data

US 2023/0090296 A1  Mar. 23, 2023

Related U.S. Application Data

(63) Continuation of application No. PCT/CN2022/090859, filed on May 5, 2022.

(30) Foreign Application Priority Data

May 18, 2021 (CN) .......................... 202110537182.6

(51) Int. Cl.
  *G06F 16/00* (2019.01)
  *G06F 16/182* (2019.01)
(52) U.S. Cl.
  CPC .................................. *G06F 16/182* (2019.01)

(58) Field of Classification Search
  None
  See application file for complete search history.

(56) References Cited

U.S. PATENT DOCUMENTS

| | | | |
|---|---|---|---|
| 2019/0295049 | A1 | 9/2019 | Karame et al. |
| 2021/0012336 | A1 | 1/2021 | Zhuo |

(Continued)

FOREIGN PATENT DOCUMENTS

| | | | |
|---|---|---|---|
| CN | 110060064 | A | 7/2019 |
| CN | 111159293 | A | 5/2020 |

(Continued)

OTHER PUBLICATIONS

International Search Report and Written Opinion in PCT/CN2022/090859, mailed Jul. 13, 2022, 13 pages.

(Continued)

*Primary Examiner* — Alex Gofman
*Assistant Examiner* — Suman Rajaputra
(74) *Attorney, Agent, or Firm* — ArentFox Schiff LLP

(57) ABSTRACT

A transaction transmitted by a user node in a blockchain network and transaction verification information corresponding to the to-be-verified transaction are acquired. The transaction verification information includes a state read set, a state write set, an initial transaction execution result, and a block identifier of a target block. A first block header of the target block includes the block identifier. A second block header is determined from a block header chain of a light node in the blockchain network. The state read set and the state write set are checked based on a first state snapshot in the second block header. The transaction service is executed to obtain a target transaction execution result corresponding to the transaction service and to-be-written state data. Legitimacy of the to-be-verified transaction is checked based on the initial transaction execution result, the target transaction (Continued)

execution result, the state write set, and the to-be-written state data.

20 Claims, 13 Drawing Sheets

(56) References Cited

U.S. PATENT DOCUMENTS

| | | | |
|---|---|---|---|
| 2021/0117385 A1* | 4/2021 | Haldar | G06F 11/1448 |
| 2021/0184837 A1* | 6/2021 | Yang | H04L 9/3239 |
| 2021/0273807 A1* | 9/2021 | Wertheim | G06F 9/466 |

FOREIGN PATENT DOCUMENTS

| | | | |
|---|---|---|---|
| CN | 112085504 A | 12/2020 | |
| CN | 112967065 A | 6/2021 | |
| CN | 113435896 A | 9/2021 | |

OTHER PUBLICATIONS

Extended European Search Report issued in European Application No. 22803781.8, mailed on Mar. 20, 2024, 9 pages.

\* cited by examiner

TRANSACTION VERIFICATION OF A TRANSACTION BASED ON A BLOCKCHAIN NETWORK

RELATED APPLICATIONS

The present application is a continuation of International Application No. PCT/CN2022/090859, entitled "TRANSACTION VERIFICATION METHOD AND APPARATUS, DEVICE, AND STORAGE MEDIUM" and filed on May 5, 2022, which claims priority to Chinese Patent Application No. 202110537182.6, entitled "TRANSACTION VERIFICATION METHOD AND APPARATUS, DEVICE, AND STORAGE MEDIUM" and filed on May 18, 2021. The entire disclosures of the prior applications are hereby incorporated by reference in their entirety.

FIELD OF THE TECHNOLOGY

This application relates to the field of blockchain technology, including transaction verification of a transaction based on a blockchain network.

BACKGROUND OF THE DISCLOSURE

It is to be understood that when generating a new block, a block generation node in a blockchain network is required to collect unacknowledged transactions propagated in the blockchain network, and then may execute transaction services corresponding to the collected transactions one by one, so as to obtain a transaction execution result. In the process of executing the transaction services, the block generation node is required to acquire all state data from a genesis block to a current latest block (i.e., block with a maximum generation timestamp) in advance from a blockchain of the blockchain network, so as to check the legitimacy of the transaction. For example, when executing an asset transfer service corresponding to a certain transaction, the block generation node is required to determine whether an asset transfer party has a sufficient credit. At this moment, the block generation node takes a long time to read all the state data on the blockchain, so as to reduce the efficiency of legitimacy check. In this way, as blocks on the blockchain are increasing, resource overheads required for a read or write operation of the same state data will rise, thus causing a running overload of the block generation node and a longer start-up time of the block generation node.

SUMMARY

Embodiments of this disclosure provide a transaction verification method and apparatus, a device, and a non-transitory computer-readable storage medium, which can accelerate the start-up of a block generation node.

According to an aspect of the disclosure, a method of transaction verification is provided. In an example, the method is performed by a light node in a blockchain network. In the method, a transaction transmitted by a user node in the blockchain network and transaction verification information corresponding to the to-be-verified transaction are acquired. The transaction verification information is determined by a full node in the blockchain network by executing a transaction service corresponding to the to-be-verified transaction. The transaction verification information includes a state read set that includes state data associated with the to-be-verified transaction, a state write set that includes state data associated with the executed transaction service, an initial transaction execution result of the executed transaction service, and a block identifier of a target block with a maximum generation timestamp on a full blockchain of the full node.

According to an aspect of the disclosure, a transaction verification method is provided. In an example, the method is performed by a full node in a blockchain network. In the method, a to-be-verified transaction transmitted by a user node in the blockchain network is received. A block with a maximum generation timestamp is set as a target block and a block header of the target block is set as a first block header on a full blockchain of the full node. A Merkle Patricia tree (MPT) is acquired in the target block, and a transaction service corresponding to the to-be-verified transaction is executed based on the MPT in the target block to obtain an initial transaction execution result, a state read set and a state write set corresponding to the transaction service. A block identifier in the first block header is acquired. Transaction verification information corresponding to the to-be-verified transaction is determined. The transaction verification information includes the initial transaction execution result, the state read set, the state write set, and the block identifier. The transaction verification information is transmitted to a user node in the blockchain network.

According to another aspect of the disclosure, an apparatus for transaction verification is provided. The apparatus includes processing circuitry. The processing circuitry is configured to acquire a transaction transmitted by a user node in the blockchain network and transaction verification information corresponding to the to-be-verified transaction. The transaction verification information is determined by a full node in the blockchain network by executing a transaction service corresponding to the to-be-verified transaction. The transaction verification information includes a state read set that includes state data associated with the to-be-verified transaction, a state write set that includes state data associated with the executed transaction service, an initial transaction execution result of the executed transaction service, and a block identifier of a target block with a maximum generation timestamp on a full blockchain of the full node. A first block header of the target block includes the block identifier. The maximum generation timestamp indicates that the target block is a latest generated block in the full blockchain.

The processing circuitry is configured to determine a second block header from a block header chain of the light node in the blockchain network. The second block header is matched with the block identifier in the first block header. The state read set and the state write set are checked based on a first state snapshot in the second block header to obtain a first check result of the to-be-verified transaction. The processing circuitry is configured to execute the transaction service based on the state read set in response to the first check result indicating that the state read set and the state write set are verified to obtain a target transaction execution result corresponding to the transaction service and to-be-written state data. The processing circuitry is configured to check legitimacy of the to-be-verified transaction based on the initial transaction execution result, the target transaction execution result, the state write set, and the to-be-written state data.

Aspects of the disclosure also provide a nontransitory computer-readable medium storing instructions which, when executed by at least one processor, cause the at least one processor to perform a method of transaction verification. In the method, a transaction transmitted by a user node in the blockchain network and transaction verification information corresponding to the to-be-verified transaction are acquired. The transaction verification information is determined by a full node in the blockchain network by executing a transaction service corresponding to the to-be-verified transaction. The transaction verification information includes a state read set that includes state data associated with the to-be-verified transaction, a state write set that includes state data associated with the executed transaction service, an initial transaction execution result of the executed transaction service, and a block identifier of a target block with a maximum generation timestamp on a full blockchain of the full node.

In embodiments of this disclosure, a block generation node in a blockchain network (i.e., an SPV node in the blockchain network), while receiving a transaction-to-be-verified transmitted by a user node in the blockchain network, also receives transaction verification information determined by a full node in the blockchain network after executing a transaction service corresponding to the transaction-to-be-verified. The transaction verification information herein may include an initial transaction execution result, a state read set, a state write set, and a block identifier corresponding to the transaction service. The block identifier may be used for a target block with a maximum generation timestamp on a full blockchain of the full node, and a first block header of the target block includes the block identifier. Based on this, the block generation node is not required to take a lot of time to synchronize all state data from a genesis block of the full blockchain to the target block, but directly searches for a second block header matching the block identifier from a block header chain of the block generation node, and then checks the legitimacy of the transaction-to-be-verified (or to-be-verified transaction) based on a first state snapshot of the second block header and the transaction verification information, whereby the efficiency of legitimacy check can be improved, thereby alleviating the running burden of the block generation node, so as to greatly accelerate the start-up of the block generation node.

DESCRIPTION OF EMBODIMENTS

The technical solutions in embodiments of this disclosure are described in the following with reference to the accompanying drawings in the embodiments of this disclosure. The described embodiments are merely some rather than all of the embodiments of this disclosure. Other embodiments are within the scope of this disclosure.

Figure 1:
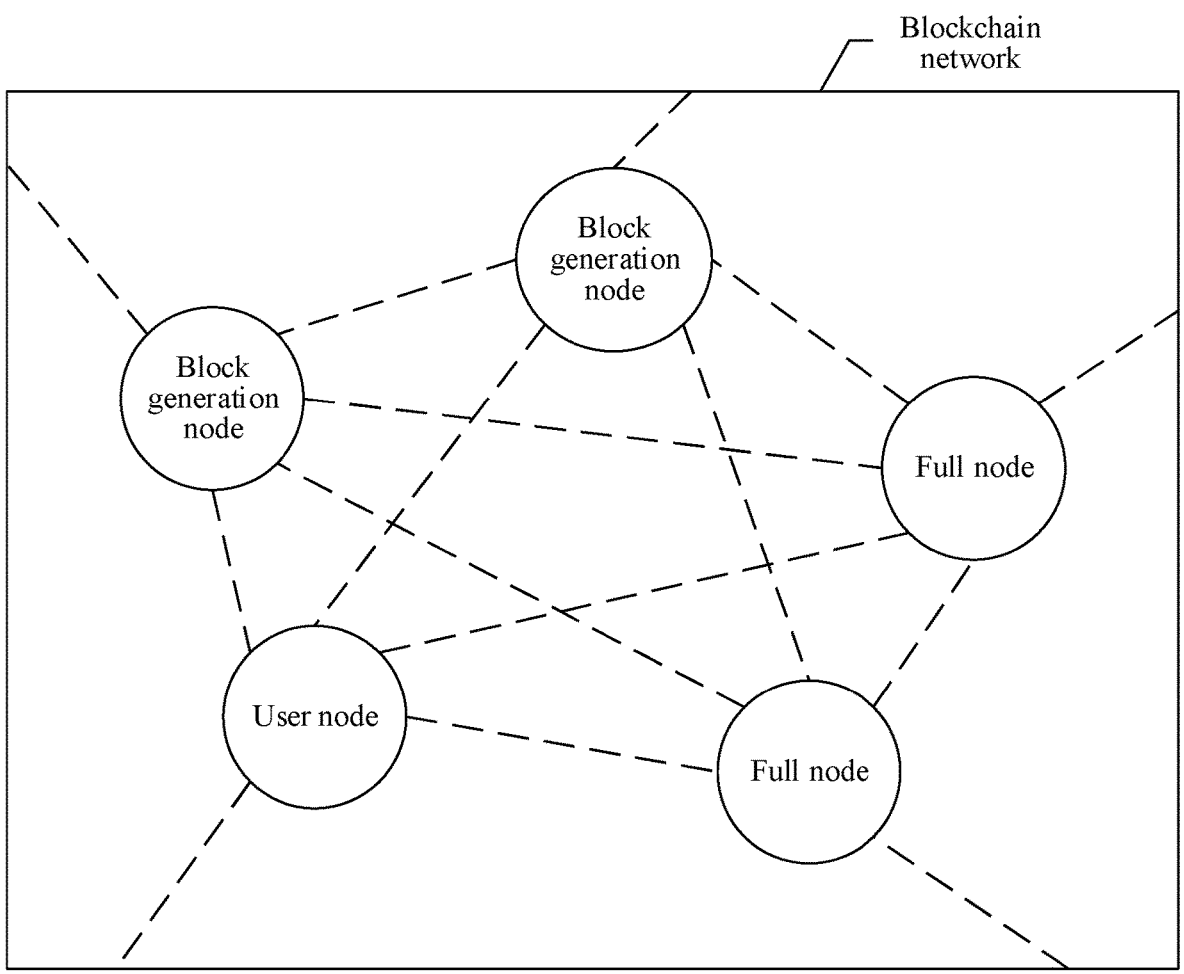
FIG. 1 is a schematic diagram of a blockchain network structure according to an embodiment of this disclosure.

Reference is made to FIG. 1. FIG. 1 is a schematic diagram of a blockchain network structure according to an embodiment of this disclosure. The blockchain network structure shown in FIG. 1 may be applied to a blockchain system. The blockchain system may be a distributed system formed of a plurality of blockchain nodes connected by means of network communication. In other words, all blockchain nodes may establish a point to point or peer to peer (P2P) connection with each other to form a P2P network (i.e., the blockchain network shown in FIG. 1).

The blockchain node herein may be any form of computer device accessing the blockchain network. For example, the computer device may be a user terminal accessing the blockchain network or a server accessing the blockchain network, and the specific form of the blockchain node is not limited herein. It is to be understood that the user terminal herein may include a smart terminal having a data processing function such as a smart phone, a tablet computer, a notebook computer, or a desktop computer. A target application (i.e., an application client) may be installed in the user terminal. When the application client runs in the user terminal, data interaction may be performed with other blockchain nodes in the blockchain network shown in FIG. 1. The application client may include social clients, multimedia clients (e.g., video clients), entertainment clients (e.g., game clients), educational clients, live clients, and other application clients. The application client may be, but is not limited to, an independent client, or an embedded sub-client integrated into a client (e.g., a social client, an educational client, a multimedia client, etc.). The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

As shown in FIG. 1, the blockchain network may include three types of blockchain nodes, and specifically may include a full node, a block generation node and a user node. The full node refers to a blockchain node for storing complete block data. In the embodiments of this disclosure, a blockchain of the full node may be referred to as a full blockchain, and each block in the full blockchain may include a block header and a block body. The block header may include a state snapshot for determining the integrity of state data, a block identifier of a current block (e.g., a block height or a block hash), a parent block hash, and a generation timestamp, etc. The block body may include an MPT in which leaf nodes (i.e., data nodes) may store specific state data. This means that the full blockchain of the full node is required to retain complete state data of all accounts.

It is to be understood that the block generation node in the embodiments of this disclosure refers to a blockchain node for generating a new block header. In order to greatly reduce the consumption of storage space, the block generation node may be an SPV node (or a light node) in the blockchain network. The SPV node herein refers to a blockchain node for storing block header information in block data without storing complete block data. In other words, in the embodiments of this disclosure, a blockchain of the block generation node may be referred to as a block header chain (i.e., an SPV blockchain), and the block header chain may be a chain-type structure formed by connecting a plurality of block headers end to end. This means that the block header chain of the block generation node may retain state snapshots for determining the integrity of state data instead of complete state data of all accounts.

The user node in the embodiments of this disclosure refers to a blockchain node deployed on a user side and controlled by a user. It is to be understood that the user node may be deployed separately at a certain computer device for assembling a transaction-to-be-verified (or a to-be-verified transaction), such as transaction 1, for the user. The user node may interact with a full node in the blockchain network (the full node is deployed on a different computer device than the user node). For example, the user node may transmit transaction 1 to the full node, whereby the full node simulates execution of a transaction service corresponding to transaction 1 and receives transaction verification information obtained by the full node after the execution of the transaction service corresponding to transaction 1. In addition, the user node may interact with the block generation node in the blockchain network. For example, the user node may transmit the transaction verification information transmitted by the full node and the transaction-to-be-verified (i.e., transaction 1) assembled by the user node together to the block generation node, whereby the block generation node checks the legitimacy of transaction 1 based on the received transaction verification information. Alternatively, the user node may be co-deployed on the same computer device as the full node in the blockchain network. This means that the user node will have a node function of the full node, i.e., storing complete block data. Therefore, after assembling a transaction-to-be-verified (e.g., transaction 2) for the user, the user node may directly execute a transaction service corresponding to transaction 2 to obtain transaction verification information corresponding to transaction 2. At this moment, the user node may directly transmit transaction 2 and the transaction verification information corresponding to transaction 2 together to the block generation node, whereby the block generation node checks the legitimacy of transaction 2 based on the received transaction verification information.

It can be seen therefrom that when receiving a transaction-to-be-verified transmitted by the user node in the blockchain network, the block generation node in the embodiments of this disclosure may receive transaction verification information corresponding to the transaction-to-be-verified together. Therefore, when the block generation node checks the legitimacy of the transaction-to-be-verified, it is not necessary to acquire all state data stored in the full blockchain, but to check the legitimacy of the transaction-to-be-verified according to the received transaction verification information. The transaction verification information herein may include a state read set, a state write set, an initial transaction execution result, and a block identifier. The block identifier is used for a target block with a maximum generation timestamp on the full blockchain of the full node, and a first block header of the target block includes the block identifier. Therefore, the process of checking the transaction-to-be-verified may include the following checking. Firstly, when finding a block header (i.e., a second block header) matching a block identifier in a block header chain, the block generation node may acquire a first state snapshot in the second block header, and then check two sets (i.e., a state read set and a state write set) in transaction verification information based on the first state snapshot to obtain a first check result. The block generation node may execute the transaction service corresponding to the transaction-to-be-verified based on the state read set in a case that the first check result indicates a successful check to obtain a target transaction execution result and state data-to-be-written (or to-be-written state data). Then, the block generation node may check the legitimacy of the transaction-to-be-verified based on the initial transaction execution result, the target transaction execution result, the state write set, and the state data-to-be-written. This means that the block generation node is not required to take time to read all the state data on the full blockchain, but to directly check the legitimacy of the transaction-to-be-verified according to the received transaction verification information, so as to alleviate the running burden of the block generation node, thereby greatly accelerating the start-up of the block generation node.

Figure 2:
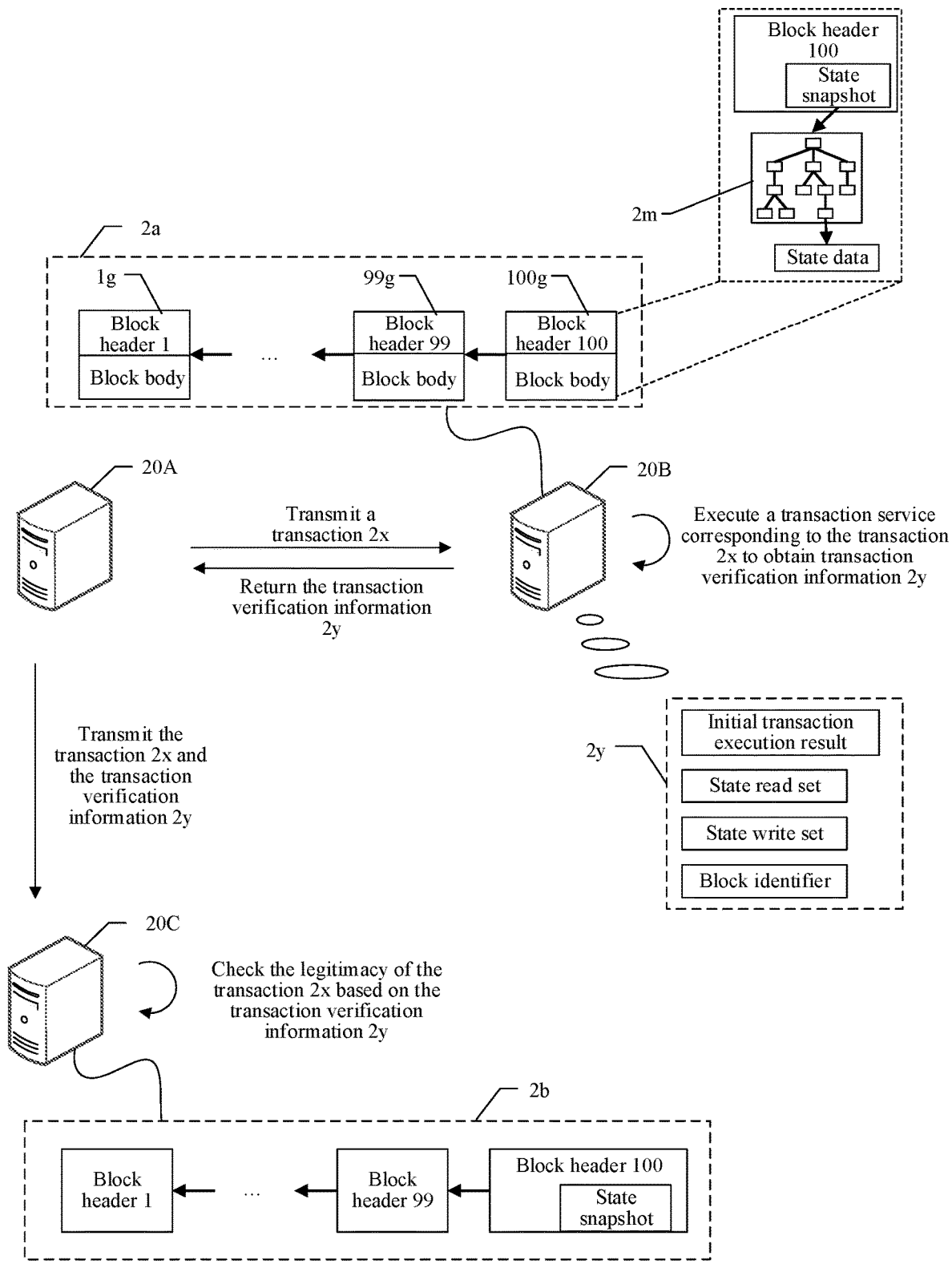
FIG. 2 is a schematic diagram of a scenario of data interaction according to an embodiment of this disclosure.

To facilitate understanding, reference is further made to FIG. 2. FIG. 2 is a schematic diagram of a scenario of data interaction according to an embodiment of this disclosure. As shown in FIG. 2, a user node 20A may be the user node in the blockchain network shown in FIG. 1, and the user node 20A may be configured to assemble a transaction-to-be-verified for a user. A full node 20B in the embodiments of this disclosure may be the full node in the blockchain network shown in FIG. 1, and the full node 20B may store complete state data of all accounts. A block generation node 20C in the embodiments of this disclosure may be the block generation node in the blockchain network shown in FIG. 1, and the block generation node 20C may be an SPV node capable of collecting a transaction-to-be-verified in a current blockchain network so as to perform legitimacy check.

It is to be understood that the transaction-to-be-verified in the embodiments of this disclosure may include, but is not limited to, asset transfer transactions (e.g., transactions in service scenarios such as mortgages, loans, and virtual asset flows) and contract signing transactions. The virtual assets herein may refer to game credits, game diamonds, game equipment, electronic bills, etc. For example, in a virtual asset flow scenario where a user (e.g., user 1) corresponding to the user node 20A has 10 game credits in an account balance. When user 1 desires to transfer a virtual asset (e.g., 3 game credits) to an account of another user (e.g., user 2), user 1 may perform a trigger operation on the user node 20A such that the user node 20A may assemble a transaction (e.g., a transaction 2x shown in FIG. 2) for user 1 in response to the trigger operation. The trigger operation herein may include, but is not limited to, a contact operation such as a click and a long press, or a non-contact operation such as a voice and a gesture.

Further, the user node 20A may take the transaction 2x as a transaction-to-be-verified, and then transmit the transaction 2x to the full node 20B shown in FIG. 2, whereby the full node 20B may execute a transaction service corresponding to the transaction 2x, thereby obtaining transaction verification information (e.g., transaction verification information 2y shown in FIG. 2) corresponding to the transaction 2x. The full blockchain of the full node 20B may be a blockchain 2a shown in FIG. 2, and the blockchain 2a may include a plurality of blocks having complete block data. In the embodiments of this disclosure, there are, for example, 100 blocks, which may specifically include block 1g, block 2g, . . . , block 99g, and block 100g. Block 1g may be referred to as a genesis block of the blockchain 2a. Each block in the blockchain 2a may include a block header and a block body. For example, block 1g may include block header 1 and a block body.

It is to be understood that the full node 20B, upon receiving the transaction 2x, may take a block with a maximum generation timestamp (e.g. block 100g shown in FIG. 2) as a target block on the blockchain 2a, and then take block header 100 in block 100g as a first block header. Further, the full node 20B may acquire an MPT (e.g. an MPT 2m shown in FIG. 2) in block 100g, and simulate execution of a transaction service corresponding to the transaction 2x based on the MPT 2m, so as to obtain a transaction execution result (i.e., an initial transaction execution result), a state read set and a state write set corresponding to the transaction service. At this moment, the full node 20B may acquire a block identifier in the first block header, and then take the initial transaction execution result, the state read set, the state write set, and the block identifier as the transaction verification information 2y corresponding to the transaction 2x. The block identifier herein may refer to, but is not limited to, a block height of the target block (e.g. block 100g), or a block hash of the target block.

It is to be understood that the full node 20B may return the transaction verification information 2y to the user node 20A. Further, the user node 20A may transmit the transaction 2x generated thereby and the transaction verification information 2y returned by the full node 20B together to the block generation node 20C shown in FIG. 2, whereby the block generation node 20C checks the legitimacy of the transaction 2x based on the transaction verification information 2y, and thus the legitimacy of the transaction 2x can be determined. An SPV blockchain of the block generation node 20C (i.e., a block header chain) may be a block header chain 2b shown in FIG. 2. The block header chain 2b is formed by connecting a plurality of block headers end to end. In the embodiments of this disclosure, there are, for example, 100 block headers, which may specifically include block header 1, block header 2, . . . , block header 99, and block header 100. Each block header may include a state snapshot for determining the integrity of all state data of a current block.

It is to be understood that when receiving the transaction 2x and the transaction verification information 2y transmitted by the user node 20A, the block generation node 20C may search the block header chain 2b shown in FIG. 2 for a block header (e.g., block header 100 in the block header chain 2b) matching the block identifier in the first block header, take the block header found as a second block header, and then check the state read set and the state write set in the transaction verification information 2y based on a state snapshot (i.e., a first state snapshot) in the second block header to obtain a first check result of the transaction 2x, so as to determine whether the transaction service corresponding to the transaction 2x can be executed by the block generation node 20C. When the first check result indicates a failed check, the block generation node 20C may determine that the transaction service corresponding to the transaction 2x cannot be executed by the block generation node 20C, i.e., the transaction 2x is not legitimate. Alternatively, when the first check result indicates a successful check, the block generation node 20C may determine that the transaction service corresponding to the transaction 2x can be executed. At this moment, the block generation node 20C may execute the transaction service corresponding to the transaction 2x based on the state read set to obtain a target transaction execution result corresponding to the transaction service and state data-to-be-written (e.g., 7 game credits). Further, the block generation node 20C may continue to check the legitimacy of the transaction 2x according to the initial transaction execution result, the state write set, the target transaction execution result, and the state data-to-be-written.

If the initial transaction execution result is consistent with the target transaction execution result, a proof of existence (i.e., a second proof of existence) of second state data in the state write set is legitimate, and the second state data is consistent with the state data-to-be-written, the block generation node 20C may determine that the transaction 2x is legitimate. Alternatively, if the initial transaction execution result is inconsistent with the target transaction execution result, or the second proof of existence of the second state data in the state write set is not legitimate, or the second state data is inconsistent with the state data-to-be-written, the block generation node 20C may determine that the transaction 2x is not legitimate.

It can be seen therefrom that when checking the transaction 2x, the block generation node 20C in the embodiments of this disclosure is not required to synchronize state data of all accounts from the blockchain 2a, but to directly check the legitimacy of the transaction 2x according to the received transaction verification information 2y (i.e., transaction verification information obtained after the full node 20B simulates execution of the transaction service corresponding to the transaction 2x when receiving the transaction 2x), so as to alleviate the running burden of the block generation node 20C, thereby greatly accelerating the start-up of the block generation node 20C.

The specific implementation of checking the legitimacy of the transaction-to-be-verified by the block generation node in the blockchain network based on the acquired transaction verification information may be seen from the following embodiments corresponding to FIGS. 3-10.

Figure 3:
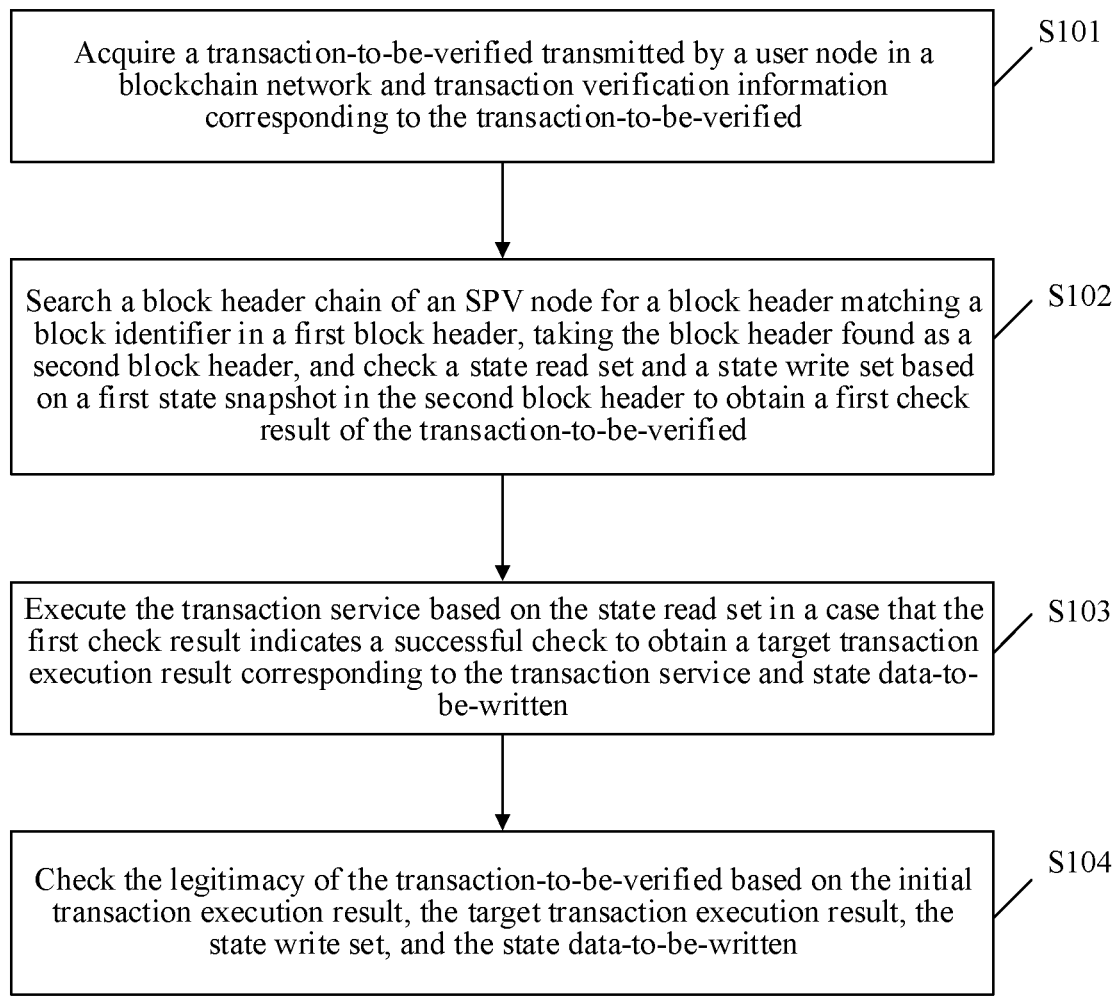
FIG. 3 is a schematic flowchart of a transaction verification method according to an embodiment of this disclosure.

Reference is further made to FIG. 3. FIG. 3 is a schematic flowchart of a transaction verification method according to an embodiment of this disclosure. As shown in FIG. 3, the method may be performed by a block generation node in a blockchain network. The block generation node may be, but is not limited to, a user terminal accessing the blockchain network or a server accessing the blockchain network. To facilitate understanding, the embodiments of this disclosure are illustrated with an example where the method is performed by the user terminal. The method may include at least the following steps S101-S104:

In step S101, a transaction-to-be-verified transmitted by a user node in a blockchain network and transaction verification information corresponding to the transaction-to-be-verified are acquired.

In an example, a to-be-verified transaction transmitted by a user node in the blockchain network and transaction verification information corresponding to the to-be-verified transaction are acquired. The transaction verification information is determined by a full node in the blockchain network by executing a transaction service corresponding to the to-be-verified transaction. The transaction verification information includes a state read set that includes state data associated with the to-be-verified transaction, a state write set that includes state data associated with the executed transaction service, an initial transaction execution result of the executed transaction service, and a block identifier of a target block with a maximum generation timestamp on a full blockchain of the full node, a first block header of the target block includes the block identifier. The maximum generation timestamp indicates that the target block is a latest generated block in the full blockchain.

Specifically, a block generation node in a blockchain network may acquire a transaction-to-be-verified transmitted by a user node in the blockchain network and transaction verification information corresponding to the transaction-to-be-verified. The transaction-to-be-verified herein may be a transaction generated by the user node in response to a trigger operation (e.g., a click operation) of a user. The transaction verification information herein may be verification information obtained after a full node in the blockchain network executes a transaction service corresponding to the transaction-to-be-verified when receiving the transaction-to-be-verified transmitted by the user node. The user node and the full node herein may be co-deployed on the same computer device or may be deployed on different computer devices, without limitation herein. In the embodiments of this disclosure, the user node and the full node may be deployed on, for example, different computer devices, for illustrating the legitimacy check of information of the transaction-to-be-verified by the block generation node.

It is to be understood that a user (e.g., a first user) corresponding to the user node in the blockchain network may perform a trigger operation (e.g., a click operation) on a certain transaction service. For example, the transaction service may be a service that transfers an electronic bill of the first user to another user (e.g., a second user). At this moment, the user node may generate a transaction-to-be-verified for broadcast to the blockchain network in response to the trigger operation. Meanwhile, in order to effectively ensure the authenticity and security of the transaction-to-be-verified during transmission in the blockchain network, the user node may sign the transaction-to-be-verified based on a user private key (i.e., a private key of the first user) to obtain transaction signature information of the transaction-to-be-verified. Further, the user node may transmit the transaction-to-be-verified along with the transaction signature information to the full node in the blockchain network. It is to be understood that when the transaction signature information corresponding to the transaction-to-be-verified is acquired, the full node may acquire a user public key (i.e., a public key of the first user) corresponding to the user private key, and then verify the transaction signature information based on the user public key, so as to obtain a verification result.

Figure 4:
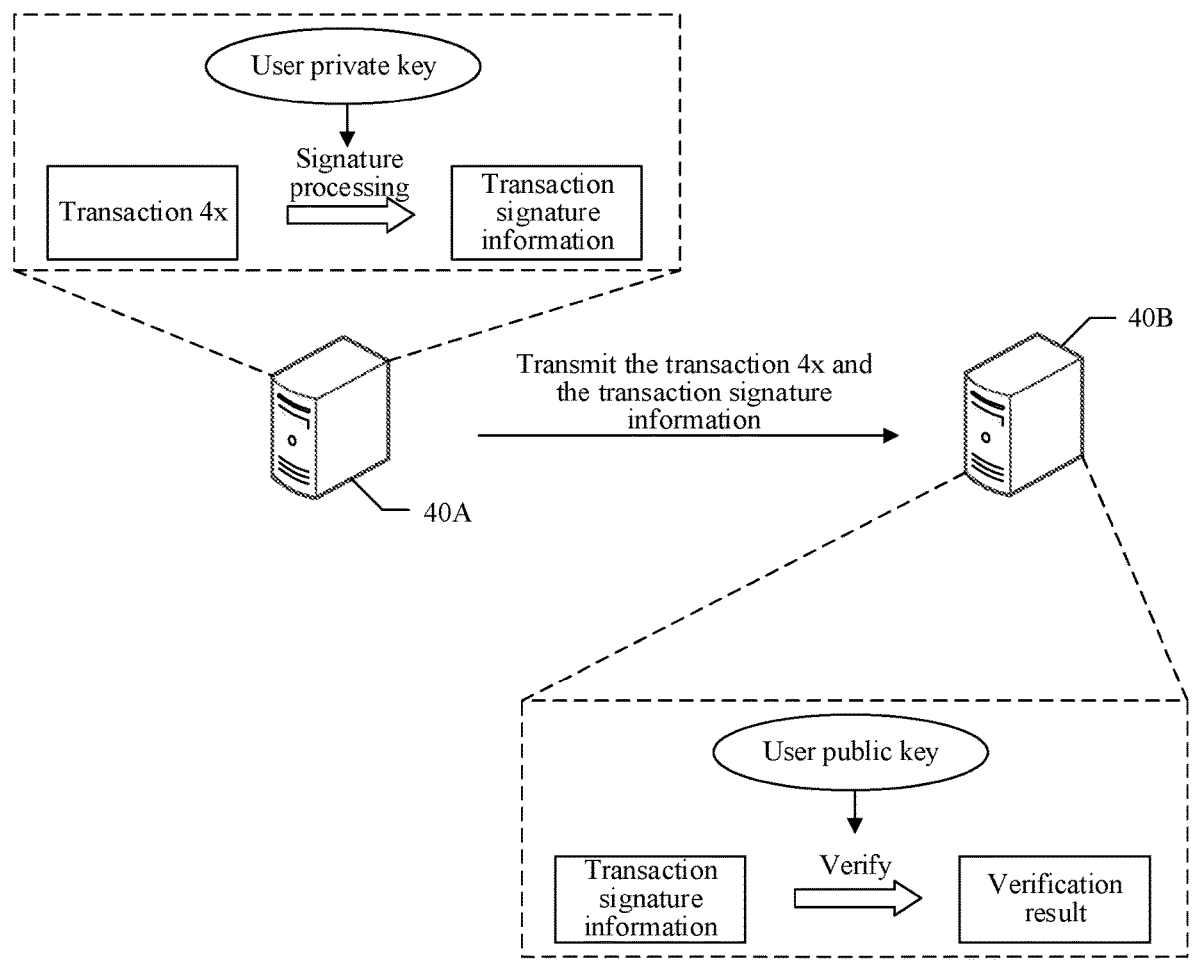
FIG. 4 is a schematic diagram of a scenario of verifying transaction signature information according to an embodiment of this disclosure.

To facilitate understanding, reference is further made to FIG. 4. FIG. 4 is a schematic diagram of a scenario of verifying transaction signature information according to an embodiment of this disclosure. As shown in FIG. 4, a user node 40A in the embodiments of this disclosure may be a user-controlled blockchain node in a blockchain network. For example, the user node 40A may be the user node 20A shown in FIG. 2. A full node 40B in the embodiments of this disclosure may be a blockchain node in the blockchain network having the function of saving complete block data. For example, the full node 40B may be the full node 20B shown in FIG. 2.

It is to be understood that the user node 40A shown in FIG. 4 may generate a transaction-to-be-verified (e.g., a transaction 4x shown in FIG. 4) for broadcast to the blockchain network in response to a trigger operation of a user (e.g., user 1) corresponding to the user node 40A. At this moment, the user node 40A may sign the transaction 4x based on a user private key of user 1 to obtain transaction signature information corresponding to the transaction 4x. It is to be understood that the user node 40A may acquire a hash calculation rule for the transaction-to-be-verified. The hash calculation rule may be a summary algorithm agreed in advance for the user node 40A and other block nodes in the blockchain network (e.g., the full node 40B). Therefore, the user node 40A may perform hash calculation on the transaction 4x based on the hash calculation rule, so as to obtain summary information (e.g., summary information h) of the transaction 4x. In the embodiments of this disclosure, the summary information of the transaction 4x determined by the user node 40A may be referred to as first summary information. Further, the user node 40A may sign the first summary information based on the user private key of user 1, so that the transaction signature information shown in FIG. 4 may be obtained.

Further, the user node 40A may transmit the transaction 4x and the transaction signature information together to the full node 40B shown in FIG. 4, whereby the full node 40B verifies the transaction signature information based on a user public key corresponding to the user private key (i.e., a user public key of user 1) to obtain a verification result. It is to be understood that the full node 40B may acquire the user public key of user 1, and then verify the transaction signature information based on the user public key to obtain the first summary information of the transaction 4x. Meanwhile, the full node 40B may also acquire the same hash calculation rule as the user node 40A, and perform hash calculation on the transaction 4x, so as to obtain summary information (e.g., summary information H) of the transaction 4x. In the embodiments of this disclosure, the summary information of the transaction 4x determined by the full node 40B may be referred to as second summary information.

At this moment, the full node 40B may compare the first summary information with the second summary information to obtain a verification result, so as to determine whether the transaction 4x has been tampered with. It is to be understood that if the first summary information is not identical to the second summary information, the full node 40B may determine that the verification result indicates a verification failure. Alternatively, if the first summary information is identical to the second summary information, the full node 40B may determine that the verification result indicates a successful verification. This means that the transaction 4x is not tampered with and that the transaction 4x is indeed transmitted by the user node 40A.

It is to be understood that when the verification result indicates a successful verification, the full node in the embodiments of this disclosure may acquire a block (e.g., block 100g in the blockchain 2a shown in FIG. 2) with a maximum generation timestamp on a full blockchain of the full node, take the acquired block as a target block, and then take a block header of the target block as a first block header. Further, the full node may acquire an MPT in the target block, and execute a transaction service corresponding to the transaction-to-be-verified based on the acquired MPT, so as to determine transaction verification information corresponding to information of the transaction-to-be-verified.

A state snapshot for determining the integrity of state data is retained in a block header of a block header chain (i.e., an SPV blockchain) of the block generation node in the embodiments of this disclosure. It is to be understood that a state snapshot of a certain block header may represent a fixed length of all state data of a corresponding block. If the state data of the current block changes, the state snapshot will change accordingly, so as to determine the integrity of all the state data. The state data herein represents the state data of the current blockchain network. For example, for an Ethereum blockchain network, the state data herein may include an account balance of a certain user, an unacknowledged transaction that has been issued, the code of a certain contract, the value of a storage item therein, some data related to the operation of a consensus mechanism, etc.

In a block of a full blockchain stored by the full node in the embodiments of this disclosure, not only a state snapshot for determining the integrity of state data is retained, but also complete state data of all accounts is retained. It is to be understood that each block in the full blockchain may include block header information and block body information. The block header information may include a state snapshot, and the block body information may include an MPT. The MPT may have the following functions: storing key-value data of any length, providing a mechanism of quickly calculating a maintained dataset hash identifier, providing a mechanism of quick state rollback, providing a proof method referred to as a Merkle proof, extending SPV nodes, and realizing simplified payment verification.

The MPT is a tree structure for organizing data, including three types of nodes: a data node, an expansion node and a branch node. It is to be understood that the data node herein refers to a leaf node of the tree structure, appearing at the bottom of the MPT for storing specific state data. The expansion node herein refers to a parent node having a child node, which may contain a string (key) of any length and a hash pointer pointing to the child node. The branch node herein refers to a parent node having 1 to 16 child nodes, and has a hash array with a capacity of 16. Characters of these 16 positions in the array respectively correspond to 0-9 and a-f in a hexadecimal system, and respectively have the possibility of pointing to a child node as a hash pointer. The 16 characters may specifically include character "0", character "1", character "2", character "3", character "4", character "5", character "6", character "7", character "8", character "9", character "a", character "b", character "c", character "d", character "e", and character "f". It is to be understood that an index relationship in which the child node points to the parent node may be referred to as a first node index relationship, e.g., a bottom-up index relationship as indicated in the MPT, in the embodiments of this disclosure. An index relationship in which the parent node points to the child node may also be referred to as a second node index relationship, e.g., a top-down index relationship as indicated in the MPT, in the embodiments of this disclosure.

Figure 5:
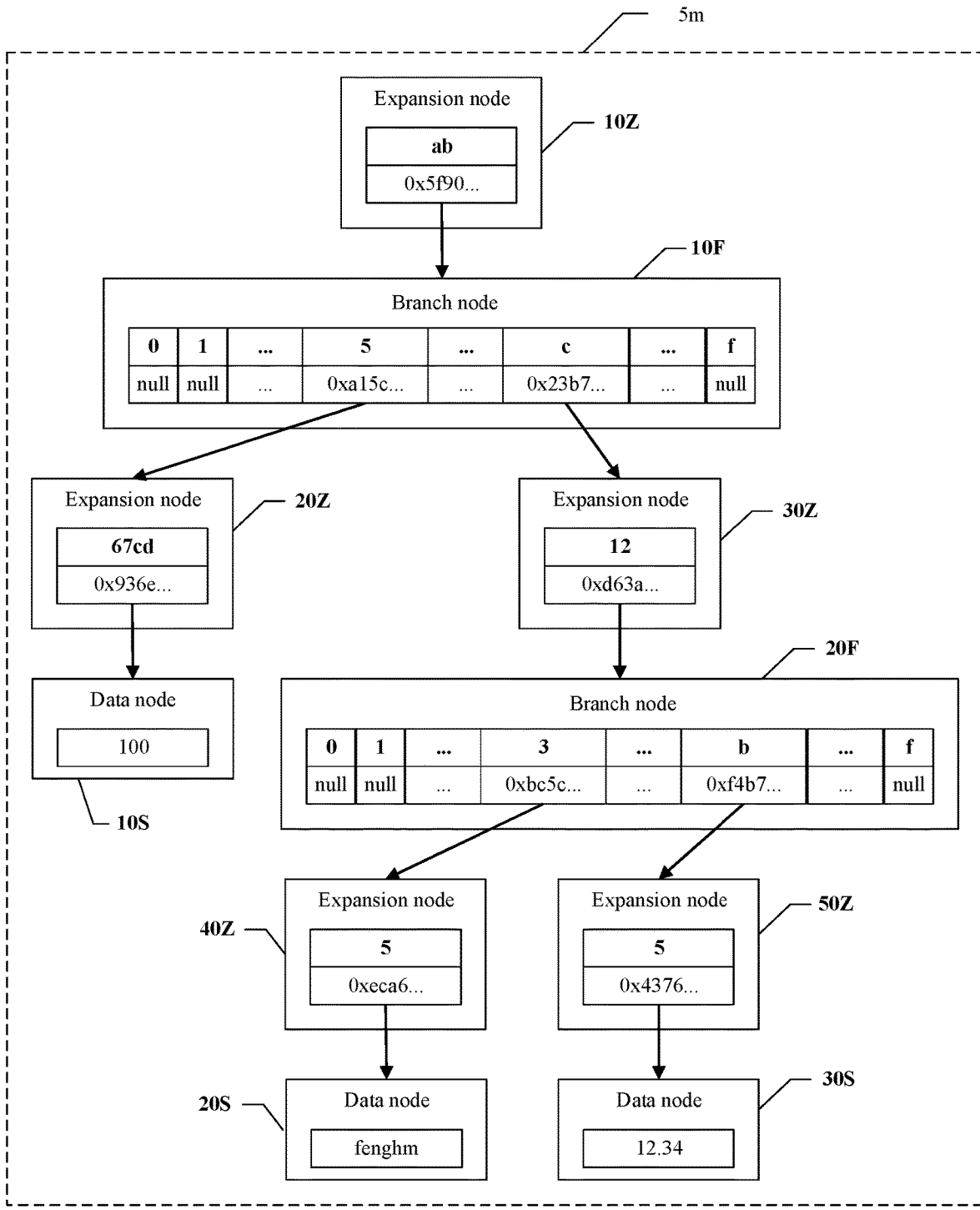
FIG. 5 is a schematic structural diagram of an MPT according to an embodiment of this disclosure.

To facilitate understanding, reference is further made to FIG. 5. FIG. 5 is a schematic structural diagram of an MPT according to an embodiment of this disclosure. As shown in FIG. 5, an MPT 5m in the embodiments of this disclosure may be an MPT stored by a certain block of a full blockchain in a blockchain network. For example, the MPT 5m may be an MPT in a target block acquired by a full node (e.g., the MPT 2m in block 100g of the blockchain 2a shown in FIG. 2).

To facilitate understanding, reference is further made to Table 1. Table 1 is state data associated with a current blockchain network provided in the embodiments of this disclosure. As shown in Table 1:

TABLE 1

State data associated with a current blockchain network

| | key | value |
|---|---|---|
| state data 1 | ab567cd | 100 |
| state data 2 | abc1235 | fenghm |
| state data 3 | abc12b5 | 12.34 |

Each state data is stored as (key, value). key shown in Table 1 refers to a key string of the state data, and value refers to a specific value of the state data. A plurality of state data may be included in the embodiments of this disclosure. For example, there are three state data, which may specifically include state data 1, state data 2 and state data 3. For example, a key string of state data 1 may be "ab567cd", and a specific value of state data 1 may be 100. A key string of state data 2 may be "abc1235", and a specific value of state data 2 may be fenghm. A key string of state data 3 may be "abc12b5", and a specific value of state data 3 may be 12.34.

It is to be understood that the full node in the embodiments of this disclosure may organize the state data shown in Table 1, so as to construct the MPT 5m shown in FIG. 5. As shown in FIG. 5, the MPT 5m may include a root node (e.g., expansion node 10Z), an intermediate node (e.g., branch node 10F, expansion node 20Z, expansion node 30Z, branch node 20F, expansion node 40Z, and expansion node 50Z), and a leaf node (e.g., data node 10S, data node 20S and data node 30S).

A root hash of the root node of the MPT 5m may be taken as a state snapshot of a block where the MPT 5m is located. For example, if the MPT 5m is the MPT 2m stored in block 100g of the blockchain 2a shown in FIG. 2, the root hash may be taken as a state snapshot of block header 100 in block 100g shown in FIG. 2. The state snapshot may be used for determining the integrity of all state data in block 100g shown in FIG. 2. Based on this, the state snapshot of block header 100 (i.e., the second block header) in the block header chain 2b shown in FIG. 2 may also be the root hash of the MPT 5m.

It is to be understood that the hash pointer of each node in the MPT 5m may be used for pointing to a child node hash of the corresponding child node. For example, expansion node 10Z may include a string of any length (e.g., "ab") and a hash pointer for pointing to a child node. The hash pointer may be used for pointing to the child node (e.g., branch node 10F shown in FIG. 5) of expansion node 10Z. Based on this, the key string in each state data shown in Table 1 may correspond to a real node path from the root node in the MPT 5m to the corresponding data node.

For data node 10S for storing state data 1 (e.g., 100), node path 1 associated with data node 10S may be: the hash pointer of expansion node 10Z points to branch node 10F, the hash pointer of character "5" in branch node 10F points to expansion node 20Z, and the hash pointer of expansion node 20Z points to data node 10S.

For data node 20S for storing state data 2 (e.g., fenghm), node path 2 associated with data node 20S may be: the hash pointer of expansion node 10Z points to branch node 10F, the hash pointer of character "c" in branch node 10F points to expansion node 30Z, the hash pointer of expansion node 30Z points to branch node 20F, the hash pointer of character "3" in branch node 20F points to expansion node 40Z, and the hash pointer of expansion node 40Z points to data node 20S.

For data node 30S for storing state data 3 (e.g., 12.34), node path 3 associated with data node 30S may be: the hash pointer of expansion node 10Z points to branch node 10F, the hash pointer of character "c" in branch node 10F points to expansion node 30Z, the hash pointer of expansion node 30Z points to branch node 20F, the hash pointer of character "b" in branch node 20F points to expansion node 50Z, and the hash pointer of expansion node 50Z points to data node 20S.

It is to be understood that the full node in the embodiments of this disclosure may acquire an MPT in the target block, and then execute a transaction service corresponding to the transaction-to-be-verified based on the acquired MPT to obtain an initial transaction execution result, a state read set and a state write set corresponding to the transaction service.

It is to be understood that the full node may acquire an MPT in the target block, take the acquired MPT as a pending tree, read state data associated with the transaction-to-be-verified from the pending tree, and then take the read state data as first state data. Further, the full node may execute a transaction service corresponding to the transaction-to-be-verified based on the first state data so as to obtain an initial transaction execution result corresponding to the transaction service, record state data simulated to be written in a block following the target block in the process of executing the transaction service, and take the recorded state data as second state data. The initial transaction execution result herein may be a transaction execution result indicating a successful transaction execution or a transaction execution failure.

For example, if the transaction service corresponding to the transaction-to-be-verified received by the full node is: 10 game credits are transferred from an account of a user (e.g., user 1) corresponding to the user node in the blockchain network to another user (e.g., user 2), and then the first state data read by the full node may be state data 1 (e.g., 100) stored by data node 10S in the MPT 5m shown in FIG. 5, i.e. there are 100 game credits in an account balance of user 1. In the process of executing the transaction service corresponding to the transaction-to-be-verified based on these 100 game credits, the full node has recorded 90 state data (i.e., second state data) required to be written in a block following the target block. This means that the account balance of user 1 further includes 90 game credits after the full node simulates execution of the transaction service.

Further, the full node may collect a first proof of existence of the first state data based on the pending tree, and then generate a state read set based on the first proof of existence. It is to be understood that there may be one or more first state data associated with the transaction-to-be-verified that is read by the full node while executing the transaction services. Based on this, the full node may generate a state read set based on all first proofs of existence collected.

Figure 6:
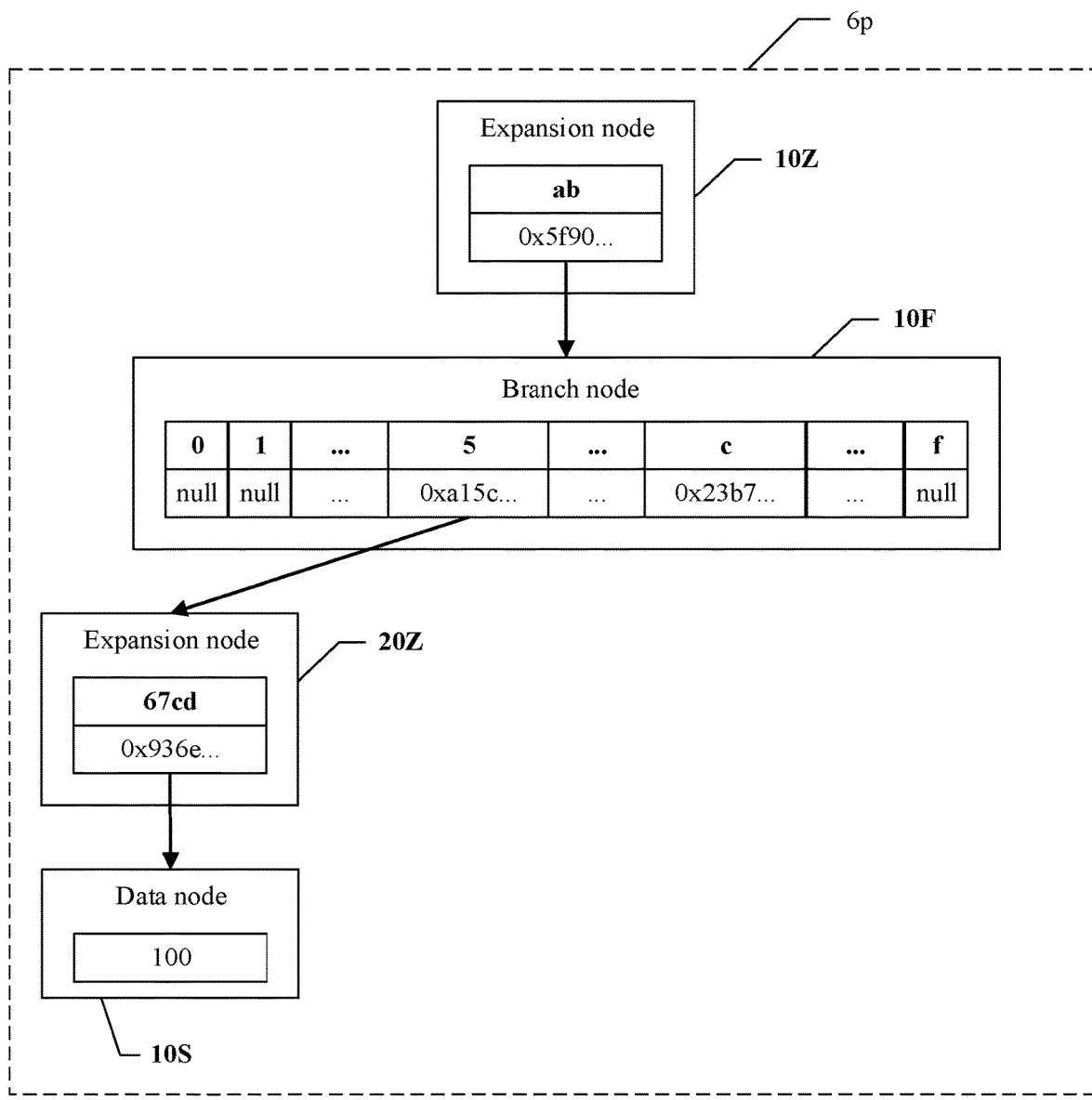
FIG. 6 is a schematic diagram of a first proof of existence of first state data according to an embodiment of this disclosure.

As shown in FIG. 5, the full node may take the MPT 5m shown in FIG. 5 as a pending tree, and then find a data node for storing the first state data (e.g., data node 10S for 100 state data 1) in the MPT 5m. At this moment, the full node may acquire a node path (e.g., node path 1) associated with data node 10S based on the MPT 5m. The node path may include data node 10S, expansion node 20Z, branch node 10F, and expansion node 10Z. Further, the full node may take the acquired node path as a first proof of existence of the first state data. Reference may be made herein FIG. 6. FIG. 6 is a schematic diagram of a first proof of existence of first state data according to an embodiment of this disclosure. A proof of existence 6p shown in FIG. 6 is the first proof of existence of the first state data collected by the full node in the blockchain network.

Meanwhile, the full node in the embodiments of this disclosure may also collect a proof of modifiability and a second proof of existence of the second state data based on the pending tree, and then generate a state write set based on the proof of modifiability and the second proof of existence.

It is to be understood that the full node may acquire a key string associated with the second state data before inserting the second state data into the pending tree, and then acquire a proof of modifiability of the second state data based on the key string. In other words, the full node may acquire a key string associated with the second state data before inserting the second state data into the pending tree, and then acquire a second node index relationship (e.g., a top-down index relationship) indicated by the pending tree. Further, the full node may traverse from the root node to search for a character having the same prefix as the key string based on the second node index relationship. At this moment, the full node may obtain a pending string (or a to-be-processed string) based on all the characters found, acquire a proof of existence associated with the pending string, and take the acquired proof of existence as a proof of modifiability of the second state data.

As shown in FIG. 5, the pending tree determined by the full node may be the MPT 5m shown in FIG. 5. The full node may acquire a key string associated with the second state data (e.g., 90) before inserting the second state data into the MPT 5m, and then acquire a second node index relationship (e.g., a top-down index relationship) indicated by the MPT 5m. Further, the full node may traverse from the root node (e.g., expansion node 10Z shown in FIG. 5) to search for a character having the same prefix as the key string based on the second node index relationship. At this moment, the full node may obtain a pending string based on all the characters found.

For example, if the key string of the second state data (e.g., 90) is "ab567cd", the full node may find all the characters matching the key string in the MPT 5m shown in FIG. 5, i.e., the pending string (e.g., pending string 1) determined by the full node is "ab567cd". At this moment, the full node may acquire nodes associated with characters in pending string 1, i.e., expansion node 10Z for storing character "ab", branch node 10F for storing character "5", expansion node 20Z for storing character "67cd", and data node 10S indicated by the hash pointer of expansion node 20Z. In other words, the full node may directly take the proof of existence of data node 10S (e.g., the proof of existence 6p shown in FIG. 6) as a proof of existence associated with pending string 1, and then take the proof of existence associated with pending string 1 as the proof of modifiability of the second state data.

Figure 7:
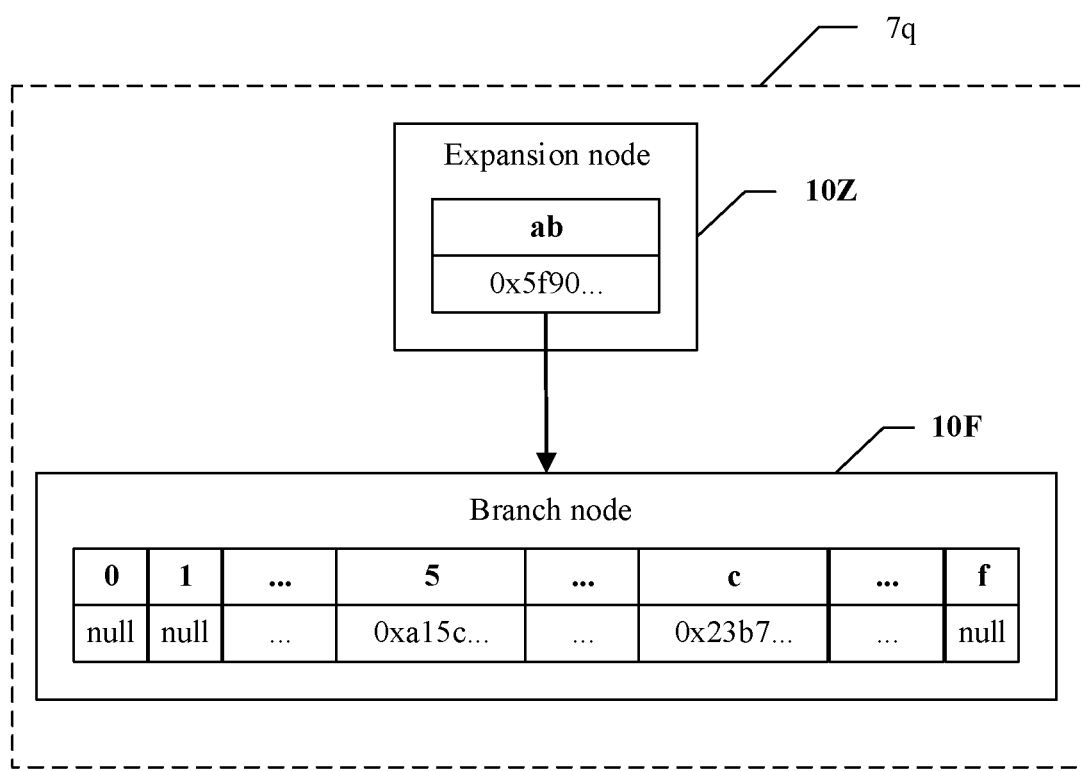
FIG. 7 is a schematic diagram of a proof of modifiability of second state data according to an embodiment of this disclosure.

Alternatively, if the key string of the second state data (e.g., 90) is "abc5678", the full node may find part of characters matching the key string in the MPT 5m shown in FIG. 5, i.e., the pending string (e.g., pending string 2) determined by the full node is "abc". At this moment, the full node may acquire nodes associated with characters in pending string 2, i.e., expansion node 10Z for storing character "ab" and branch node 10F for storing character "c". Further, the full node may obtain a proof of existence associated with pending string 2 based on the acquired two nodes, and then take the proof of existence associated with pending string 2 as the proof of modifiability of the second state data. Reference may be made herein FIG. 7. FIG. 7 is a schematic diagram of a proof of modifiability of second state data according to an embodiment of this disclosure. A proof of modifiability 7*q* shown in FIG. 7 is the proof of modifiability of the second state data collected by the full node in the blockchain network.

Further, the full node may acquire a proof of existence of the second state data after inserting the second state data into the pending tree, and then take the proof of existence of the second state data as a second proof of existence. The specific implementation of acquiring a second proof of existence of the second state data by the full node may be seen from the specific implementation of acquiring a first proof of existence of the first state data, and will not be described in detail herein. At this moment, the full node may generate a state write set based on the proof of modifiability and the second proof of existence.

It is to be understood that the full node may also acquire a block identifier in the first block header of the target block, and then take the initial transaction execution result obtained by executing the transaction service, the generated state read set and state write set, and the acquired block identifier as transaction verification information corresponding to the transaction-to-be-verified. Further, the full node may transmit the transaction verification information to the user node in the blockchain network, whereby the user node may transmit the transaction verification information and the transaction-to-be-verified together to the block generation node in the blockchain network. It is to be understood that the user node may also transmit the transaction signature information to the block generation node, whereby the block generation node verifies the transaction-to-be-verified, so that the security and authenticity when the transaction-to-be-verified is transmitted can be effectively ensured.

In step S102, a search is performed for a block header chain of the SPV node for a block header matching the block identifier in the first block header, the block header found as a second block header is taken, and the state read set and the state write set are checked based on a first state snapshot in the second block header to obtain a first check result of the transaction-to-be-verified.

In an example, a second block header is determined from a block header chain of the light node in the blockchain network. The second block header is matched with the block identifier in the first block header, and the state read set and the state write set are checked based on a first state snapshot in the second block header to obtain a first check result of the to-be-verified transaction.

The state read set and the state write set are generated by the full node in the blockchain network based on the MPT in the target block. Specifically, the block generation node in the blockchain network (i.e., an SPV node in the blockchain network) may search a block header chain of the SPV node for a block header matching the block identifier in the first block header, take the block header found as a second block header, and then take a state snapshot in the second block header as a first state snapshot in the second block header. Meanwhile, the block generation node may also acquire a first proof of existence of first state data from the state read set included in the transaction verification information, and then check the first proof of existence based on the first state snapshot, so as to obtain a first proof check result. The first state data herein may be state data read by the full node on the MPT in the target block and associated with the transaction-to-be-verified. In addition, the block generation node may also acquire a proof of modifiability of second state data from the state write set included in the transaction verification information, and then check the proof of modifiability based on the first state snapshot, so as to obtain a second proof check result. The second state data herein may be state data recorded by the full node in the process of executing the transaction service and simulated to be written in a block following the target block. Further, the block generation node may determine a first check result of the transaction-to-be-verified based on the first proof check result and the second proof check result.

As shown in FIG. 2, the block generation node 20C in the embodiments of this disclosure may acquire a block header matching the block identifier in the first block header (i.e. block header 100 in block 100*g* of the blockchain 2*a*) from the block header chain 2*b*, and then take the acquired block header as a second block header (i.e. block header 100 in the block header chain 2*b*). Further, the block generation node 20C may acquire a state snapshot in the second block header and take the acquired state snapshot as a first state snapshot.

It is to be understood that the block generation node in the blockchain network may acquire a first proof of existence of first state data from the state read set. The first proof of existence may be a node path associated with the first state data and acquired by the full node from the MPT in the target block. The node path may include a leaf node and a root node. Further, the block generation node may acquire a first node index relationship (e.g., a bottom-up index relationship) indicated by the node path, take the leaf node as a child node and take a node preceding the leaf node as a parent node corresponding to the child node based on the first node index relationship, and then compare a child node hash of the child node with a hash pointer of the parent node, so as to obtain an initial comparison result. In response to the initial comparison result indicating a successful comparison, the block generation node may update the child node and the parent node based on the first node index relationship, and obtain a first comparison result of the first proof of existence in a case that the updated parent node is the root node. Meanwhile, the block generation node may also compare a root hash of the root node with the first state snapshot to obtain a second comparison result of the first proof of existence, and then obtain a first proof check result based on the first comparison result and the second comparison result. The block generation node in the embodiments of this disclosure may traverse to compare the child node hash with the hash pointer of the parent node, and then compare the root hash of the root node with the first state snapshot. Alternatively, the block generation node may also compare the root hash of the root node with the first state snapshot, and then traverse to compare the child node hash with the hash pointer of the parent node, and the order of comparison will not be limited herein.

As shown in FIG. 6, the first proof of existence of the first state data acquired by the block generation node in the blockchain network from the state read set may be the proof of existence 6*p* shown in FIG. 6. The proof of existence 6*p* may be a node path associated with the first state data (e.g., 100) and acquired by the full node from the MPT in the target block. The node path herein may include a leaf node (e.g., data node 10S for storing the first state data), an intermediate node (e.g. expansion node 20Z and branch node 10F), and a root node (e.g. expansion node 10Z).

The block generation node in the embodiments of this disclosure may take data node 10S as a child node and take a node (i.e., expansion node 20Z) preceding data node 10S as a parent node based on the first node index relationship indicated by the node path. Further, the block generation node may acquire a node hash of data node 10S, and take the node hash of data node 10S as a child node hash. At this moment, the block generation node may compare the node hash of data node 10S with a hash pointer (e.g., 0x936e . . . ) of expansion node 20Z, so that an initial comparison result may be obtained.

If the node hash of data node 10S is inconsistent with the hash pointer of expansion node 20Z, the block generation node may determine that the initial comparison result indicates a comparison failure. At this moment, the block generation node may directly determine that the transaction-to-be-verified is not legitimate.

Alternatively, if the node hash of data node 10S is consistent with the hash pointer of expansion node 20Z, the block generation node may determine that the initial comparison result indicates a successful comparison. At this moment, the block generation node may update the child node and the parent node based on the first node index relationship. In other words, the block generation node may take expansion node 20Z as a new child node (i.e., a first updated child node), take a node (e.g., branch node 10F) preceding expansion node 20Z as a parent node (i.e., a first updated parent node) of the first updated child node, and then compare a node hash of expansion node 20Z with a hash pointer (i.e., 0xa15c . . . ) of character "5" in branch node 10F to obtain a new initial comparison result (i.e., a first updated comparison result). When the new initial comparison result indicates a successful comparison, the block generation node may continue to update the child node and the parent node, i.e. take branch node 10F as a latest child node (i.e., a second updated child node), take a node (e.g., expansion node 10Z) preceding branch node 10F as a parent node (i.e., a second updated parent node) of the second updated child node, and then compare a node hash of branch node 10F with a hash pointer (i.e., 0x5f90 . . . ) of expansion node 10Z to obtain a latest initial comparison result (i.e., a second updated comparison result). It is to be understood that when the second updated parent node is expansion node 10Z (i.e., the root node of the MPT), the block generation node may end the update and then take the latest initial comparison result as the first comparison result of the proof of existence 6p.

Further, the block generation node may acquire a node hash (i.e., a root hash) of expansion node 10Z, and compare the node hash of expansion node 10Z with the first state snapshot to obtain a second comparison result of the proof of existence 6p.

It is to be understood that if the first comparison result indicates a comparison failure and the second comparison result indicates that the root hash is inconsistent with the first state snapshot, the block generation node may determine that the first proof check result indicates a check failure. At this moment, the block generation node may directly determine that the transaction-to-be-verified is not legitimate. Alternatively, if the first comparison result indicates a successful comparison and the second comparison result indicates that the root hash is consistent with the first state snapshot, the block generation node may determine that the first proof check result indicates a successful check. At this moment, the block generation node may continue to acquire a proof of modifiability of second state data from the state write set included in the transaction verification information, and then check the proof of modifiability based on the first state snapshot, so as to obtain a second proof check result. The specific implementation of determining a second proof check result by the block generation node may be seen from the specific implementation of determining a first proof check result, and will not be described in detail herein.

At this moment, the block generation node may determine a first check result of the transaction-to-be-verified based on the first proof check result and the second proof check result. It is to be understood that when the first proof check result indicates a check failure or the second proof check result indicates a check failure, the block generation node may determine that a first check result of the transaction-to-be-verified indicates a check failure. At this moment, the block generation node may determine that the transaction-to-be-verified is not legitimate. Alternatively, when both the first proof check result and the second proof check result indicate a successful check, the block generation node may determine that the first check result of the transaction-to-be-verified indicates a successful check, and then perform the following S103 to continue to check the legitimacy of the transaction-to-be-verified.

In step S103, the transaction service is executed based on the state read set in a case that the first check result indicates a successful check to obtain a target transaction execution result corresponding to the transaction service and state data-to-be-written.

In an example, the transaction service is executed based on the state read set in response to the first check result indicating that the state read set and the state write set are verified to obtain a target transaction execution result corresponding to the transaction service and to-be-written state data.

Specifically, when the first check result indicates a successful check, the block generation node may acquire first state data from the first proof of existence in the state read set, and then execute the transaction service based on the first state data so as to obtain a transaction execution result corresponding to the transaction service. At this moment, in the embodiments of this disclosure, the transaction execution result obtained after the block generation node executes the transaction service may be referred to as a target transaction execution result. It is to be understood that the block generation node may record state data required to be written to a block following the target block in the process of executing the transaction service. In the embodiments of this disclosure, the state data required to be written to the block following the target block, which is recorded by the block generation node, may be referred to as state data-to-be-written.

For example, if the transaction service corresponding to the transaction-to-be-verified transmitted by the user node, which is received by the block generation node, is: 10 game credits are transferred from an account of a user (e.g., user 1) corresponding to the user node in the blockchain network to another user (e.g., user 2), and then the block generation node may execute the transaction service corresponding to the transaction-to-be-verified based on the first state data (e.g., 100) in the state read set, so as to obtain a target transaction execution result. In addition, the state data required to be written to the block following the target block, which is recorded by the block generation node in the process of executing the transaction service, may be 90. This means that the account balance of user 1 will be updated from 100 game credits to 90 game credits after the block generation node executes the transaction service corresponding to the transaction-to-be-verified.

In step S104, the legitimacy of the transaction-to-be-verified is checked based on the initial transaction execution result, the target transaction execution result, the state write set, and the state data-to-be-written.

In an example, legitimacy of the to-be-verified transaction is checked based on the initial transaction execution result, the target transaction execution result, the state write set, and the to-be-written state data.

Specifically, the block generation node may compare the initial transaction execution result with the target transaction execution result to obtain a third comparison result. Meanwhile, the block generation node may also acquire a second proof of existence of second state data from the state write set, and then check the second proof of existence based on the first state snapshot in the second block header. In a case of a successful check, the block generation node may compare the second state data with the state data-to-be-written to obtain a fourth comparison result. At this moment, the block generation node may obtain a second check result of the transaction-to-be-verified based on the third comparison result and the fourth comparison result, and check the legitimacy of the transaction-to-be-verified based on the second check result.

It is to be understood that the block generation node in the embodiments of this disclosure may compare the initial transaction execution result with the target transaction execution result, check the second proof of existence and then compare the second state data with the state data-to-be-written. If the third comparison result indicates that the initial transaction execution result is inconsistent with the target transaction execution result, the block generation node may determine that the third comparison result indicates a comparison failure, i.e., the transaction-to-be-verified is not legitimate. Alternatively, if the third comparison result indicates that the initial transaction execution result is consistent with the target transaction execution result, the block generation node may determine that the third comparison result indicates a successful comparison, and then continue to check the second proof of existence written in the state write set based on the first state snapshot. The specific implementation of checking the second proof of existence by the block generation node may be seen from the specific implementation of checking the first proof of existence, and will not be described in detail herein. When the check of the second proof of existence fails, the block generation node may determine that the transaction-to-be-verified is not legitimate. It is to be understood that upon successful check of the second proof of existence, the block generation node may continue to compare the second state data in the second proof of existence with the state data-to-be-written recorded by the block generation node, so that a fourth comparison result may be obtained. If the fourth comparison result indicates that the second state data is inconsistent with the state data-to-be-written, the block generation node determines that the fourth comparison result indicates a comparison failure. Based on this, the block generation node may determine that the second check result of the transaction-to-be-verified indicates a check failure, i.e. the transaction-to-be-verified is not legitimate. Alternatively, if the fourth comparison result indicates that the second state data is consistent with the state data-to-be-written, the block generation node may determine that the fourth comparison result indicates a successful comparison. Based on this, the block generation node may determine that the second check result of the transaction-to-be-verified indicates a successful check, i.e., the transaction-to-be-verified is legitimate.

The block generation node may also check the second proof of existence, compare the second state data with the state data-to-be-written, and then compare the initial transaction execution result with the target transaction execution result. The order of comparison will not be limited herein.

It can be seen therefrom that when acquiring a transaction-to-be-verified transmitted by the user node, the full node in the embodiments of this disclosure may execute a transaction service corresponding to the transaction-to-be-verified based on a target block in a full blockchain, and then take an initial transaction execution result obtained by executing the transaction service, a state read set, a state write set, and a block identifier of the target block as transaction verification information of the transaction-to-be-verified. When the block generation node in the blockchain network receives the transaction-to-be-verified, the transaction verification information determined by the full node is acquired together. Based on this, the block generation node is not required to take time to start synchronizing all state data from a genesis block of the full blockchain, but directly acquires a second block header matching the block identifier from a block header chain of the block generation node, and quickly checks the legitimacy of the transaction-to-be-verified according to a first state snapshot of the second block header and the transaction verification information, whereby the efficiency of legitimacy check can be improved, thereby alleviating the running burden of the block generation node, so as to greatly accelerate the start-up of the block generation node. In addition, since the block generation node in the embodiments of this disclosure is an SPV node in the blockchain network, the block generation node is not required to retain complete block data, but retains partial data on the block header chain formed by connecting block headers end to end, i.e. the transaction-to-be-verified may be verified, thereby greatly reducing the consumption of storage space.

Figure 8:
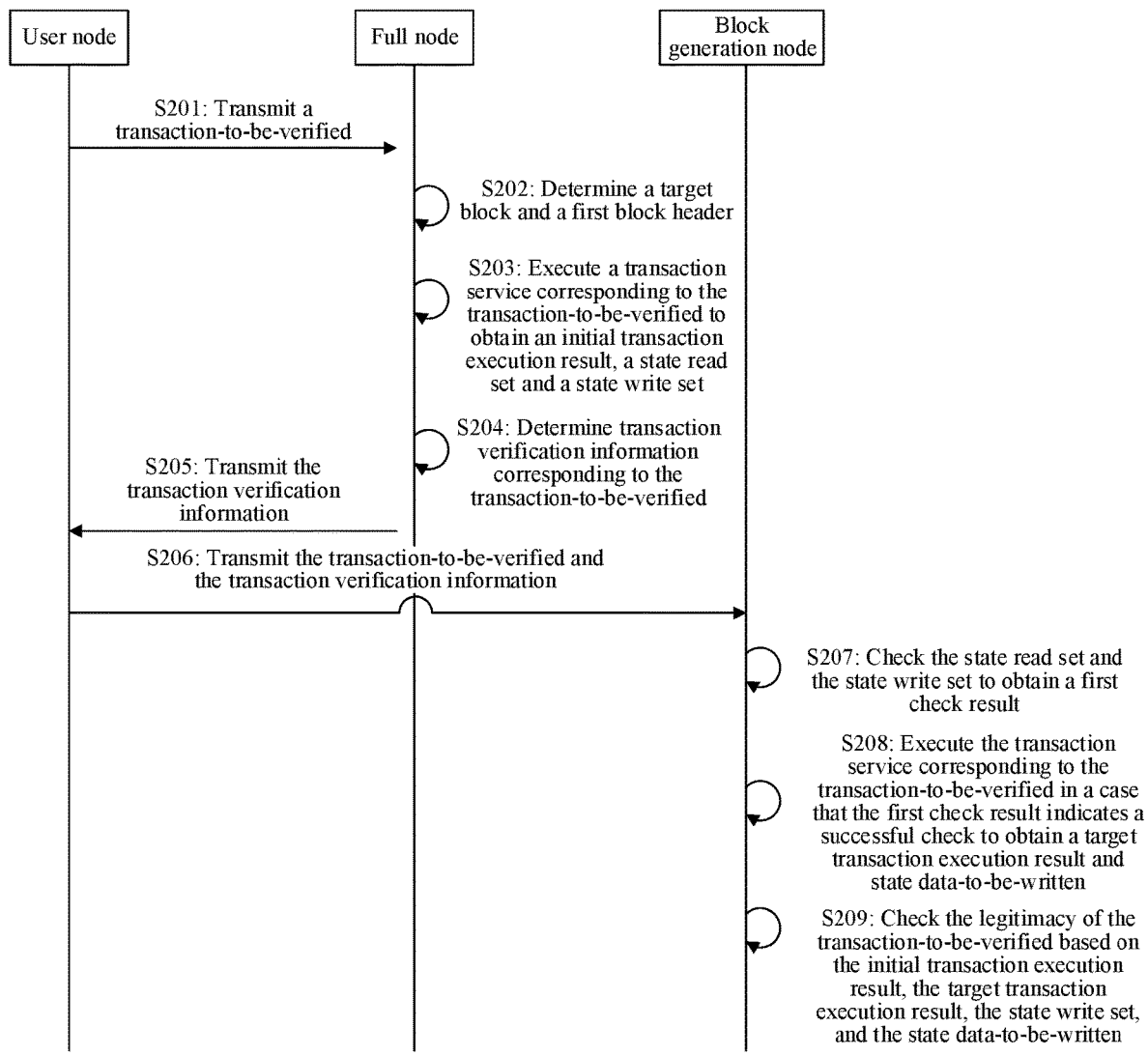
FIG. 8 is a schematic flowchart of a transaction verification method according to an embodiment of this disclosure.

Reference is further made to FIG. 8. FIG. 8 is a schematic flowchart of a transaction verification method according to an embodiment of this disclosure. As shown in FIG. 8, the method may be jointly performed by a user node, a full node and a block generation node in a blockchain network. The user node may be a user-controlled blockchain node in the blockchain network. For example, the user node may be the user node 20A shown in FIG. 2. The full node in the embodiments of this disclosure may be a blockchain node in the blockchain network having the function of saving complete block data. For example, the full node may be the full node 20B shown in FIG. 2. The block generation node may be an SPV node in the blockchain network. For example, the block generation node may be the block generation node 20C shown in FIG. 2. The method may include at least the following S201-S209:

In step S201, the user node transmits a transaction-to-be-verified assembled for a user to the full node.

In step S202, the full node takes a block with a maximum generation timestamp as a target block and takes a block header of the target block as a first block header on a full blockchain of the full node in a case that a transaction-to-be-verified associated with the user node in the blockchain network is acquired.

In an example, a block with a maximum generation timestamp is set as a target block and a block header of the target block is set as a first block header on a full blockchain of the full node.

In step S203, the full node acquires an MPT in the target block, and executes a transaction service corresponding to the transaction-to-be-verified based on the MPT in the target block to obtain an initial transaction execution result, a state read set and a state write set corresponding to the transaction service.

In step S204, the full node acquires a block identifier in the first block header, and takes the initial transaction execution result, the state read set, the state write set, and the block identifier as transaction verification information corresponding to the transaction-to-be-verified.

In an example, a block identifier in the first block header is acquired, and transaction verification information corresponding to the to-be-verified transaction is determined. The transaction verification information includes the initial transaction execution result, the state read set, the state write set, and the block identifier.

In step S205, the full node transmits the transaction verification information to the user node.

In step S206, the user node, upon reception of the transaction verification information, transmits the transaction verification information and information-to-be-verified to the block generation node.

In step S207, the block generation node searches a block header chain of the SPV node for a block header matching the block identifier in the first block header, takes the block header found as a second block header, and checks the state read set and the state write set based on a first state snapshot in the second block header to obtain a first check result of the transaction-to-be-verified.

In step S208, the block generation node executes the transaction service based on the state read set in a case that the first check result indicates a successful check to obtain a target transaction execution result corresponding to the transaction service and state data-to-be-written.

In step S209, the block generation node checks the legitimacy of the transaction-to-be-verified based on the initial transaction execution result, the target transaction execution result, the state write set, and the state data-to-be-written.

The specific implementations of S201-S209 may be seen from the description about S101-S104 in the embodiment corresponding to FIG. 3, and will not be described in detail herein.

Figure 9:
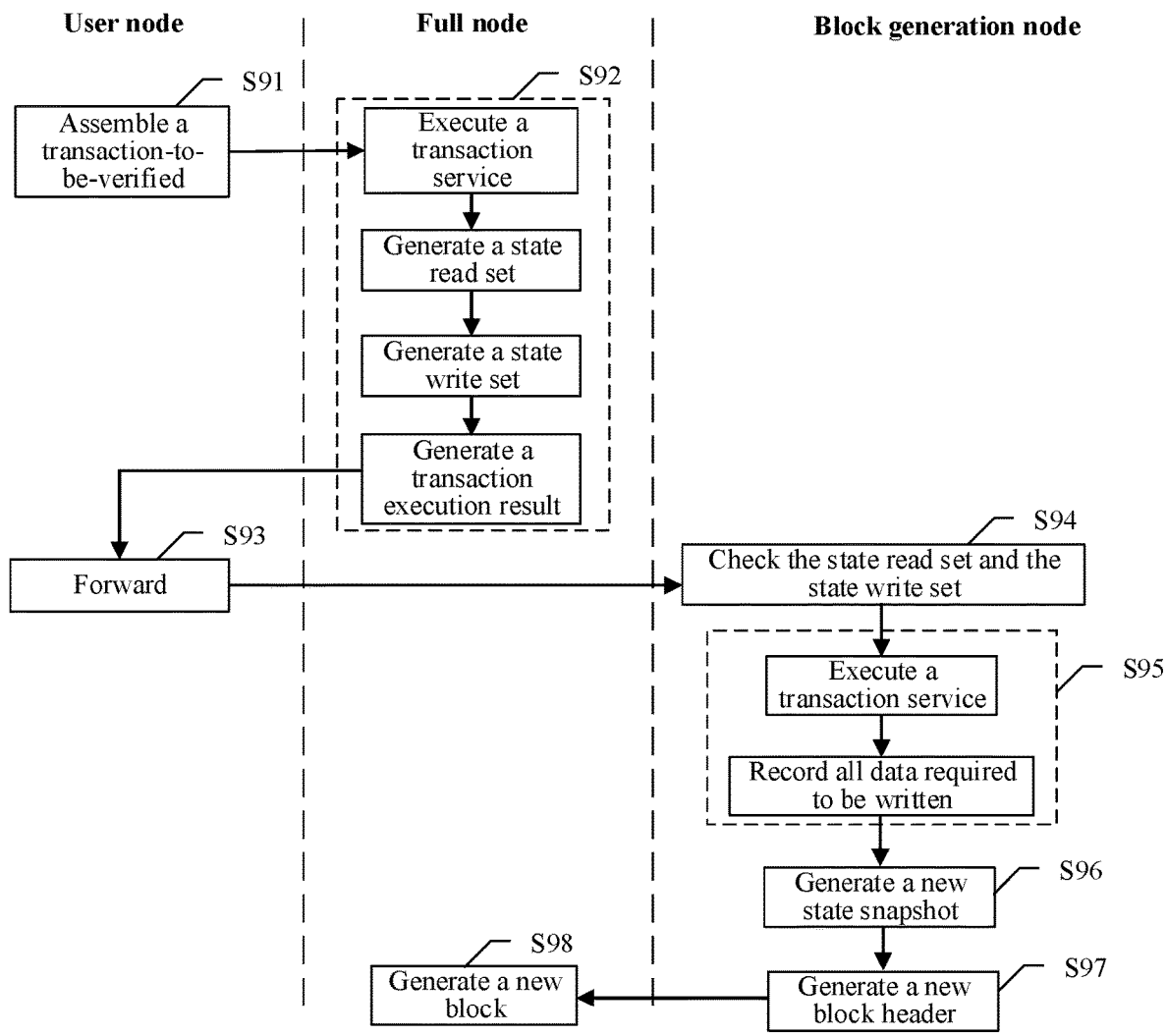
FIG. 9 is a schematic flowchart of a transaction verification method according to an embodiment of this disclosure.

To facilitate understanding, reference is further made to FIG. 9. FIG. 9 is a schematic flowchart of a transaction verification method according to an embodiment of this disclosure. As shown in FIG. 9, the method may be jointly performed by a user node, a full node and a block generation node in a blockchain network. The user node may be a user-controlled blockchain node in the blockchain network. For example, the user node may be the user node 20A shown in FIG. 2. The full node in the embodiments of this disclosure may be a blockchain node in the blockchain network having the function of saving complete block data. For example, the full node may be the full node 20B shown in FIG. 2. The block generation node may be an SPV node in the blockchain network. For example, the block generation node may be the block generation node 20C shown in FIG. 2.

As shown in FIG. 9, the user node in the embodiments of this disclosure may perform S91 when a user performs a trigger operation associated with a transaction-to-be-verified, assemble the transaction-to-be-verified for the user, and then transmit the transaction-to-be-verified to the full node. It is to be understood that when receiving a transaction-to-be-verified, the full node may perform S92 to execute a transaction service corresponding to the transaction-to-be-verified based on a target block (i.e., a block with a maximum generation timestamp) on a full blockchain of the full node so as to obtain a transaction execution result (i.e., an initial transaction execution result) corresponding to the transaction service, a state read set and a state write set, take a block identifier in a first block header (e.g., block header 100 of block 100g shown in FIG. 2) of the target block, the initial transaction execution result, the state read set and the state write set as transaction verification information of the transaction-to-be-verified, and then transmit the transaction verification information to the user node. The user node, upon reception of the transaction verification information, may perform S93 to forward the transaction verification information and the transaction-to-be-verified together to the block generation node.

When receiving the transaction-to-be-verified and the transaction verification information, the block generation node may perform S94 to acquire a block header (i.e., a second block header) matching the block identifier of the first block header from the block header chain of the block generation node, and then check the state read set and the state write set in the transaction verification information based on a state snapshot (i.e., a first state snapshot) in the second block header (e.g., block header 100 in the block header chain 2b shown in FIG. 2) to obtain a first check result. When the first check result indicates a successful check, the block generation node may perform S95 to execute the transaction service based on first state data in the state read set to obtain a target transaction execution result and record all data (i.e., state data-to-be-written) required to be written, and then check the legitimacy of the transaction-to-be-verified based on the initial transaction execution result and the state write set in the transaction verification information, the target transaction execution result obtained after executing the transaction service, and the state data-to-be-written. The specific implementation of checking the legitimacy of the transaction-to-be-verified in the embodiments of this disclosure may be seen from the description about S101-S104 in the embodiment corresponding to FIG. 3, and will not be described in detail herein.

When the transaction-to-be-verified is legitimate, the block generation node may perform S96 to generate, based on second state data in the state write set, a new state snapshot (i.e., a second state snapshot) associated with the second state data in a case of determining that the transaction-to-be-verified is legitimate. Further, the block generation node may perform S97 to generate a new block header (i.e., a pending block header or a to-be-processed block header) based on the transaction-to-be-verified, the target transaction execution result and the second state snapshot. The pending block header may be used as a block header following the second block header on the block header chain. At this moment, the block generation node may write the pending block header in the block header chain, and may transmit, after successfully writing the pending block header in the block header chain, the pending block header to the full node, whereby the full node performs S98 to re-execute a corresponding transaction service based on a transaction (the transaction-to-be-verified that has been determined to be legitimate) in the pending block header, so as to generate a new block (i.e. a pending block). Then the pending block may be written in the full blockchain as a block following the target block on the full blockchain.

Figure 10:
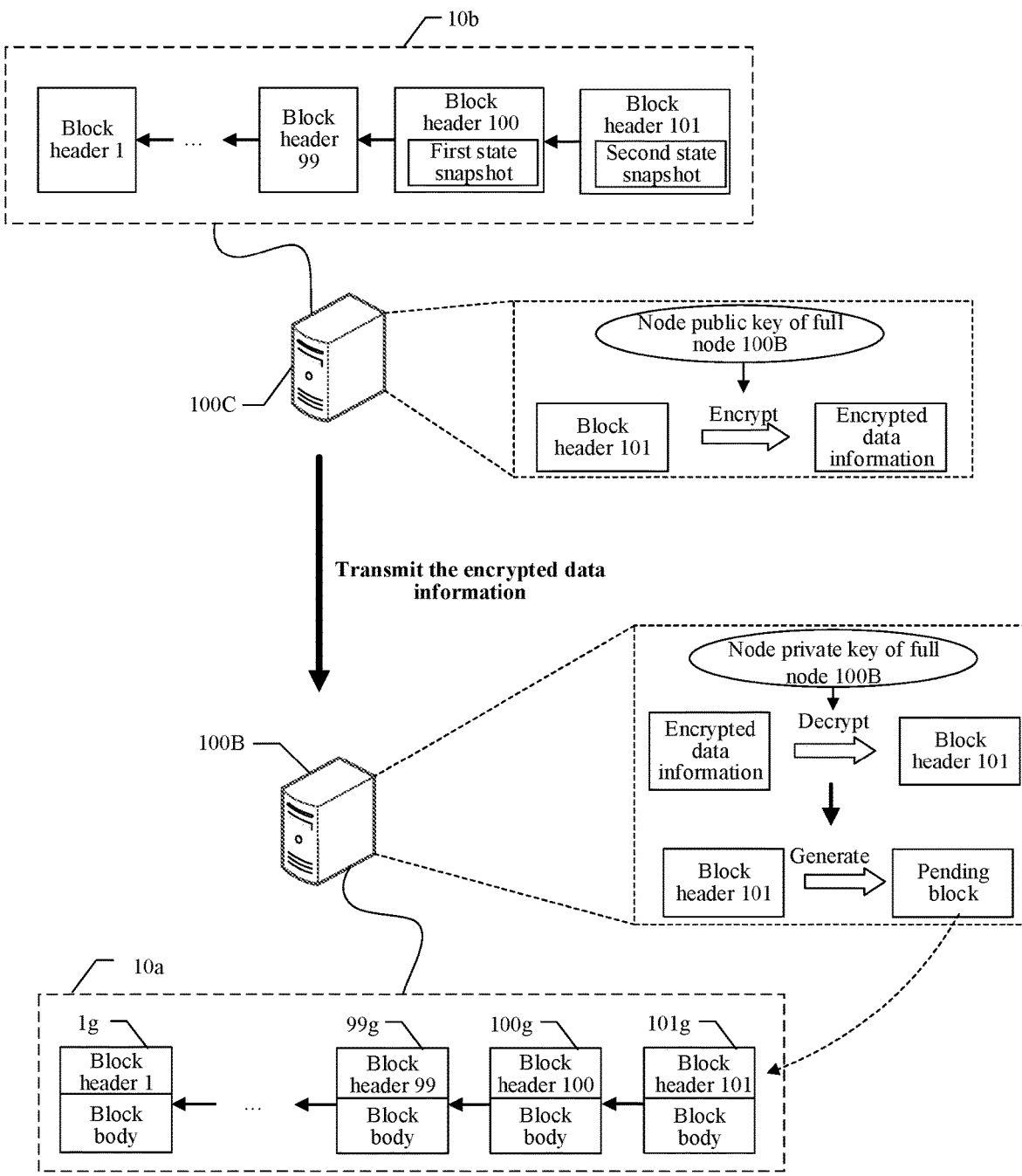
FIG. 10 is a schematic diagram of a scenario of generating a pending block according to an embodiment of this disclosure.

To facilitate understanding, reference is further made to FIG. 10. FIG. 10 is a schematic diagram of a scenario of generating a pending block according to an embodiment of this disclosure. As shown in FIG. 10, a full node 100B in the embodiments of this disclosure may be a blockchain node in the blockchain network having the function of saving complete block data. For example, the full node 100B may be the full node 20B shown in FIG. 2. A block generation node 100C may be an SPV node in the blockchain network. For example, the block generation node 100C may be the block generation node 20C shown in FIG. 2.

As shown in FIG. 10, the block header chain of the block generation node 100C in the embodiments of this disclosure may be the block header chain 10b shown in FIG. 10. Block header 100 in the block header chain 10*b* may be a second block header determined by the block generation node 100C based on the block identifier in the transaction verification information corresponding to the transaction-to-be-verified. The second block header may include a first state snapshot. Block header 101 in the block header chain 10*b* may be a new block header (i.e., a pending block header) generated by the block generation node 100C when it is determined that the transaction-to-be-verified is legitimate. Block header 101 may include a second state snapshot.

It is to be understood that the block generation node 100C may acquire second state data recorded by the full node 100B after simulating execution of the transaction service corresponding to the transaction-to-be-verified from the state write set in the transaction verification information. Further, the block generation node 100C may generate a new state snapshot (i.e., a second state snapshot) associated with the second state data based on the second state data. At this moment, the block generation node 100C may package the transaction-to-be-verified, the target transaction execution result and the second state snapshot so as to obtain a new block header (i.e., a pending block header), and then take the pending block header as a block header (i.e., block header 101) following block header 100, so as to write block header 101 in the block header chain 10*b* shown in FIG. 10.

It is to be understood that after the block generation node 100C successfully writes block header 101 to the block header chain 10*b* shown in FIG. 10, the block generation node 100C may transmit block header 101 to the full node 100B shown in FIG. 10. In order to effectively ensure the security of the pending block header during data transmission, the block generation node 100C may acquire a node public key of the full node 100B, encrypt block header 101 to obtain encrypted data information, and then transmit the encrypted data information to the full node 100B.

When receiving the encrypted data information, the full node 100B may decrypt the encrypted data information based on a node private key of the full node 100B, so that block header 101 generated by the block generation node 100C may be obtained. At this moment, the full node 100B may acquire a transaction-to-be-verified in block header 101, and then re-execute a transaction service corresponding to the transaction-to-be-verified so as to generate a new block (i.e., pending block). As shown in FIG. 10, a blockchain 10*a* may be a full blockchain of the full node 100B, and block 100*g* in the blockchain 10*a* may be a target block determined by the full node 100B.

In the process of re-executing a transaction service corresponding to the transaction-to-be-verified, the full node 100B may record state data (i.e., target state data) required to be written to the pending block, update an MPT (i.e., a pending tree or a to-be-processed tree) in block 100*g* based on the target state data so as to obtain a new MPT (i.e., a target MPT), and then generate a pending block based on the target MPT. It is to be understood that the full node 100B, after generating the pending block, may take the pending block as a block following block 100*g* (i.e., block 101*g* shown in FIG. 10) to successfully write the pending block to the blockchain 10*a*. A generation timestamp in block 101*g* is a maximum generation timestamp for updating the blockchain 10*a*.

It can be seen therefrom that when acquiring a transaction-to-be-verified transmitted by the user node, the full node in the embodiments of this disclosure may execute a transaction service corresponding to the transaction-to-be-verified based on a target block in a full blockchain, and then take an initial transaction execution result obtained by executing the transaction service, a state read set, a state write set, and a block identifier of the target block as transaction verification information of the transaction-to-be-verified. When the block generation node in the blockchain network receives the transaction-to-be-verified, the transaction verification information determined by the full node is acquired together. Based on this, the block generation node is not required to take time to start synchronizing all state data from a genesis block of the full blockchain, but directly determines the legitimacy of the transaction-to-be-verified according to a first state snapshot of the second block header in the block header chain of the block generation node and the transaction verification information, thereby alleviating the running burden of the block generation node, so as to greatly accelerate the start-up of the block generation node. In addition, since the block generation node in the embodiments of this disclosure is an SPV node in the blockchain network, the block generation node is not required to retain complete block data, but retains partial data on the block header chain formed by connecting block headers end to end, i.e., the transaction-to-be-verified may be verified, thereby greatly reducing the consumption of storage space. When the block generation node verifies that a transaction-to-be-verified is legitimate, a new block header (i.e. a pending block header) may also be generated based on the transaction-to-be-verified, and the new block header is transmitted to the full node, whereby the full node generates a new block based on the new block header, and then the legitimate transaction-to-be-verified may be successfully written in the full blockchain.

Figure 11:
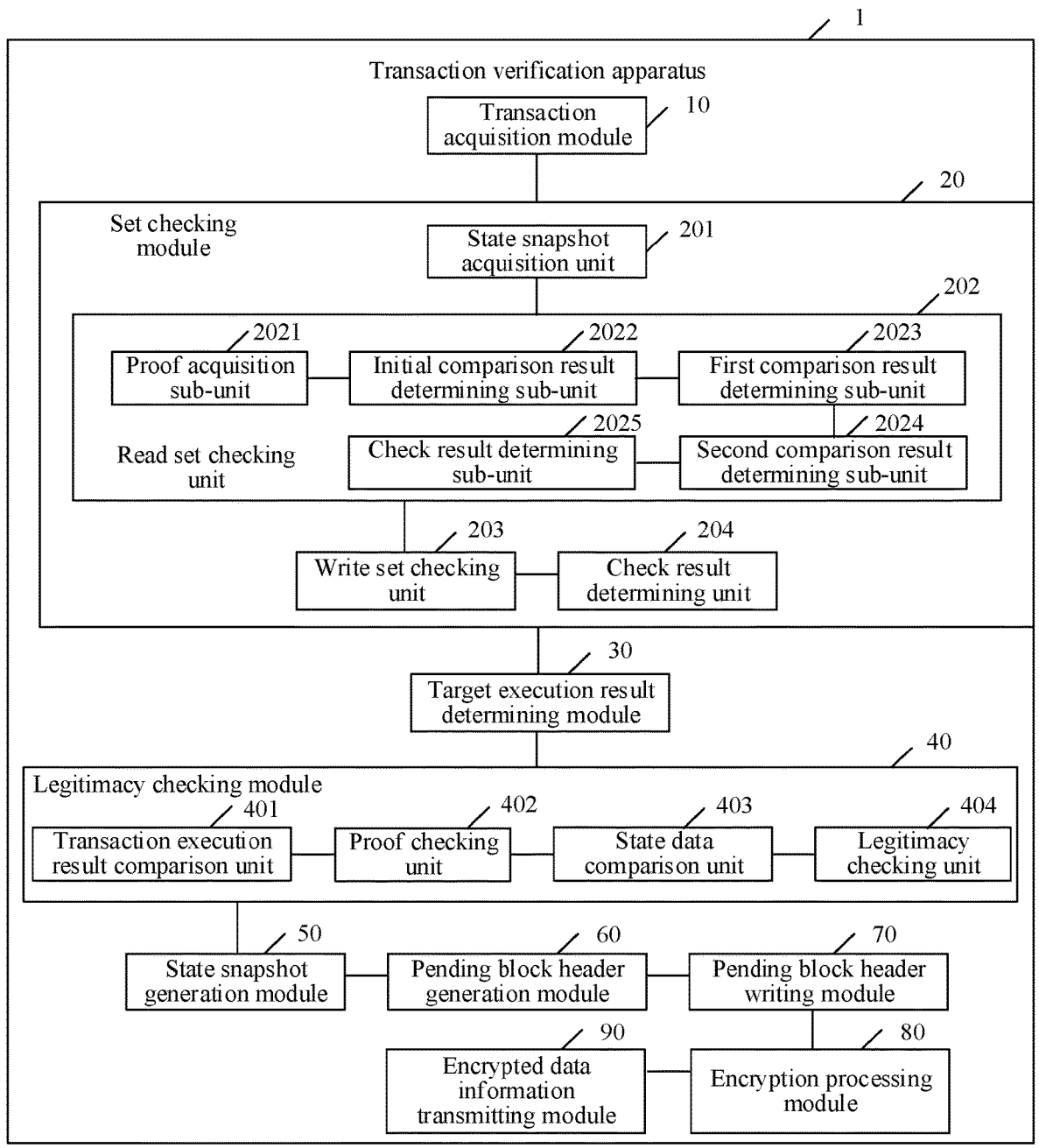
FIG. 11 is a schematic structural diagram of a transaction verification apparatus according to an embodiment of this disclosure.

Further, FIG. 11 is a schematic structural diagram of a transaction verification apparatus according to an embodiment of this disclosure. The transaction verification apparatus 1 may be a computer program (including program code) run on a computer device. For example, the transaction verification apparatus 1 is application software, and the transaction verification apparatus 1 may be configured to perform the corresponding steps in the method provided in the embodiments of this disclosure. As shown in FIG. 11, the transaction verification apparatus 1 may run on a block generation node in a blockchain network. The block generation node may be an SPV node in the blockchain network. For example, the block generation node may be the block generation node 20C in the embodiment corresponding to FIG. 2. The transaction verification apparatus 1 may include: a transaction acquisition module 10, a set checking module 20, a target execution result determining module 30, a legitimacy checking module 40, a state snapshot generation module 50, a pending block header generation module 60, a pending block header writing module 70, an encryption processing module 80, and an encrypted data information transmitting module 90. One or more modules, submodules, and/or units of the apparatus can be implemented by processing circuitry, software, or a combination thereof, for example.

The transaction acquisition module 10 is configured to acquire a transaction-to-be-verified transmitted by a user node in a blockchain network and transaction verification information corresponding to the transaction-to-be-verified. The transaction verification information is determined by a full node in the blockchain network after executing a transaction service corresponding to the transaction-to-be-verified. The transaction verification information includes a state read set, a state write set, an initial transaction execution result, and a block identifier for a target block with a maximum generation timestamp on a full blockchain of the full node, and a first block header of the target block includes the block identifier.

The set checking module 20 is configured to search a block header chain of an SPV node for a block header matching the block identifier in the first block header, take the block header found as a second block header, and check the state read set and the state write set based on a first state snapshot in the second block header to obtain a first check result of the transaction-to-be-verified.

The state read set and the state write set are generated by the full node based on an MPT in the target block.

The set checking module 20 includes: a state snapshot acquisition unit 201, a read set checking unit 202, a write set checking unit 203, and a check result determining unit 204.

The state snapshot acquisition unit 201 is configured to search a block header chain of the SPV node for a block header matching the block identifier in the first block header, take the block header found as a second block header, and take a state snapshot in the second block header as a first state snapshot in the second block header.

The read set checking unit 202 is configured to acquire a first proof of existence of first state data from the state read set, and check the first proof of existence based on the first state snapshot to obtain a first proof check result. The first state data is state data read by the full node on the MPT in the target block and associated with the transaction-to-be-verified.

The read set checking unit 202 includes: a proof acquisition sub-unit 2021, an initial comparison result determining sub-unit 2022, a first comparison result determining sub-unit 2023, a second comparison result determining sub-unit 2024, and a check result determining sub-unit 2025.

The proof acquisition sub-unit 2021 is configured to acquire a first proof of existence of first state data from the state read set. The first proof of existence is a node path acquired by the full node from the MPT in the target block and associated with the first state data. The node path includes a leaf node for storing the first state data, and a root node.

The initial comparison result determining sub-unit 2022 is configured to take the leaf node as a child node and take a node preceding the leaf node as a parent node corresponding to the child node based on a first node index relationship indicated by the node path, and compare a child node hash of the child node with a hash pointer of the parent node to obtain an initial comparison result.

The first comparison result determining sub-unit 2023 is configured to update, in response to the initial comparison result indicating a successful comparison, the child node and the parent node based on the first node index relationship, and obtain a first comparison result of the first proof of existence in a case that the updated parent node is the root node.

The second comparison result determining sub-unit 2024 is configured to compare a root hash of the root node with the first state snapshot to obtain a second comparison result of the first proof of existence.

The check result determining sub-unit 2025 is configured to obtain a first proof check result based on the first comparison result and the second comparison result.

The specific implementations of the proof acquisition sub-unit 2021, the initial comparison result determining sub-unit 2022, the first comparison result determining sub-unit 2023, the second comparison result determining sub-unit 2024, and the check result determining sub-unit 2025 may be seen from the description about the first proof check result in the embodiment corresponding to FIG. 3, and will not be described in detail herein.

The write set checking unit 203 is configured to acquire a proof of modifiability of second state data from the state write set, and check the proof of modifiability based on the first state snapshot to obtain a second proof check result. The second state data is state data recorded by the full node in the process of executing the transaction service and simulated to be written in a block following the target block.

The check result determining unit 204 is configured to determine a first check result of the transaction-to-be-verified based on the first proof check result and the second proof check result.

The specific implementations of the state snapshot acquisition unit 201, the read set checking unit 202, the write set checking unit 203, and the check result determining unit 204 may be seen from the description about S102 in the embodiment corresponding to FIG. 3, and will not be described in detail herein.

The target execution result determining module 30 is configured to execute the transaction service based on the state read set in a case that the first check result indicates a successful check to obtain a target transaction execution result corresponding to the transaction service and state data-to-be-written.

The legitimacy checking module 40 is configured to check the legitimacy of the transaction-to-be-verified based on the initial transaction execution result, the target transaction execution result, the state write set, and the state data-to-be-written.

The legitimacy checking module 40 includes: a transaction execution result comparison unit 401, a proof checking unit 402, a state data comparison unit 403, and a legitimacy checking unit 404.

The transaction execution result comparison unit 401 is configured to compare the initial transaction execution result with the target transaction execution result to obtain a third comparison result.

The proof checking unit 402 is configured to acquire a second proof of existence of second state data from the state write set, and check the second proof of existence based on the first state snapshot.

The state data comparison unit 403 is configured to compare the second state data with the state data-to-be-written in a case of a successful check to obtain a fourth comparison result.

The legitimacy checking unit 404 is configured to obtain a second check result of the transaction-to-be-verified based on the third comparison result and the fourth comparison result, and check the legitimacy of the transaction-to-be-verified based on the second check result.

The specific implementations of the transaction execution result comparison unit 401, the proof checking unit 402, the state data comparison unit 403, and the legitimacy checking unit 404 may be seen from the description about S104 in the embodiment corresponding to FIG. 3, and will not be described in detail herein.

The state snapshot generation module 50 is configured to generate, based on second state data in the state write set, a second state snapshot associated with the second state data in a case of determining that the transaction-to-be-verified is legitimate.

The pending block header generation module 60 is configured to generate a pending block header based on the transaction-to-be-verified, the target transaction execution result and the second state snapshot. The pending block header is used as a block header following the second block header.

The pending block header writing module 70 is configured to write the pending block header in the block header chain.

The encryption processing module 80 is configured to acquire, after successfully writing the pending block header in the block header chain, a node public key of the full node, and encrypt the pending block header to obtain encrypted data information.

The encrypted data information transmitting module 90 is configured to transmit the encrypted data information to the full node, whereby the full node decrypts the encrypted data information based on a node private key of the full node to obtain the pending block header for instructing the full node to generate a pending block corresponding to the pending block header. The pending block is used as a block following the target block on the full blockchain.

The specific implementations of the transaction acquisition module 10, the set checking module 20, the target execution result determining module 30, the legitimacy checking module 40, the state snapshot generation module 50, the pending block header generation module 60, the pending block header writing module 70, the encryption processing module 80, and the encrypted data information transmitting module 90 may be seen from the description about S101-S104 in the embodiment corresponding to FIG. 3, and will not be described in detail herein. In addition, beneficial effects achieved by using the same method are not described herein again.

Figure 12:
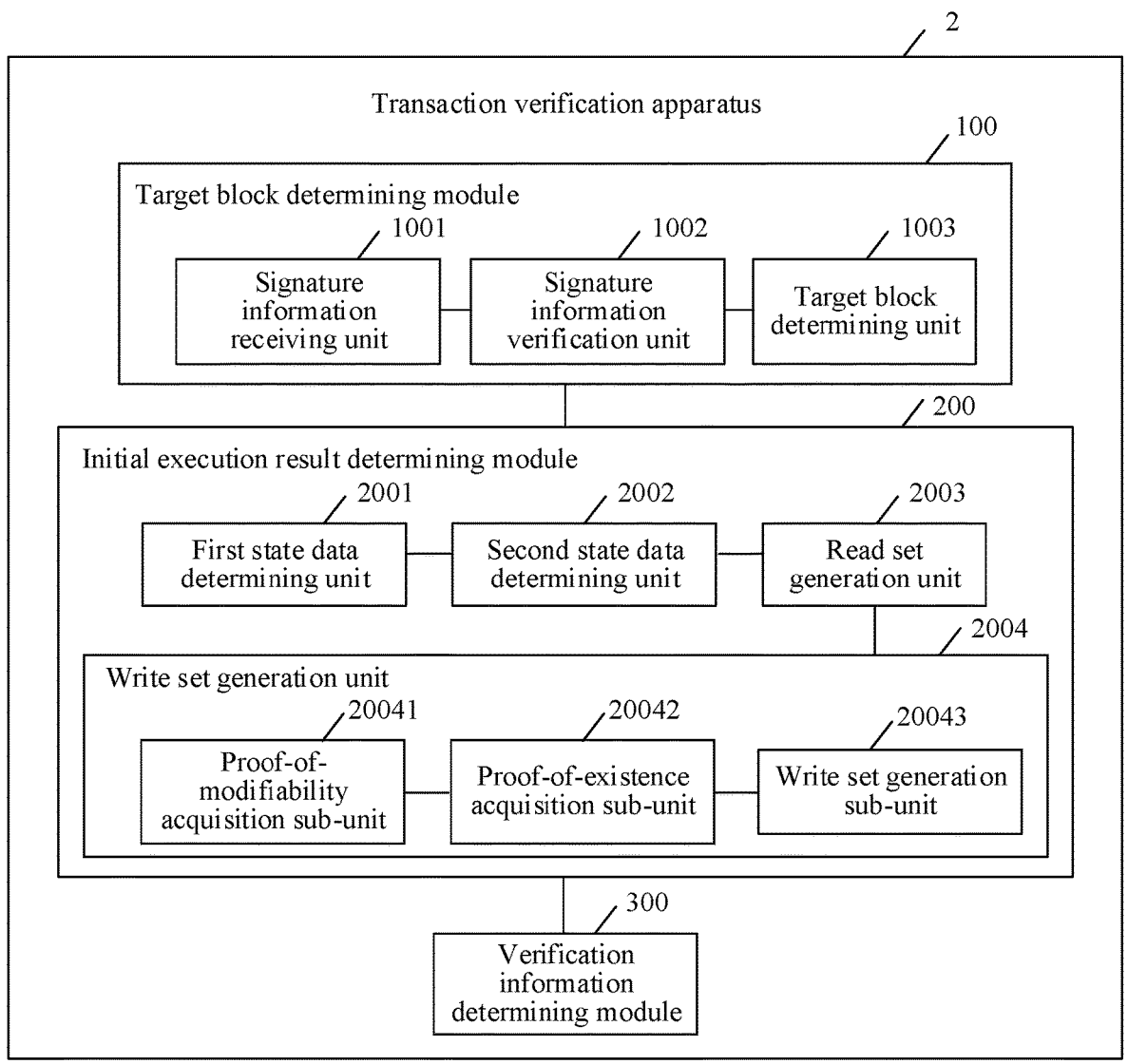
FIG. 12 is a schematic structural diagram of a transaction verification apparatus according to an embodiment of this disclosure.

Further, FIG. 12 is a schematic structural diagram of a transaction verification apparatus according to an embodiment of this disclosure. The transaction verification apparatus 2 may be a computer program (including program code) run on a computer device. For example, the transaction verification apparatus 2 is application software, and the transaction verification apparatus 2 may be configured to perform the corresponding steps in the method provided in the embodiments of this disclosure. As shown in FIG. 12, the transaction verification apparatus 2 may run on a full node in a blockchain network. The full node may be the full node 20B in the embodiment corresponding to FIG. 2. The transaction verification apparatus 2 may include: a target block determining module 100, an initial execution result determining module 200 and a verification information determining module 300. One or more modules, submodules, and/or units of the apparatus can be implemented by processing circuitry, software, or a combination thereof, for example.

The target block determining module 100 is configured to take a block with a maximum generation timestamp as a target block and take a block header of the target block as a first block header on a full blockchain of a full node in a case that a transaction-to-be-verified associated with a user node in a blockchain network is acquired.

The target block determining module 100 includes: a signature information receiving unit 1001, a signature information verification unit 1002 and a target block determining unit 1003.

The signature information receiving unit 1001 is configured to receive transaction signature information corresponding to the transaction-to-be-verified transmitted by the user node in the blockchain network. The transaction signature information is obtained after the user node signs the transaction-to-be-verified based on a user private key.

The signature information verification unit 1002 is configured to acquire a user public key corresponding to the user private key, and verify the transaction signature information based on the user public key to obtain a verification result.

The target block determining unit 1003 is configured to acquire a block with a maximum generation timestamp on a full blockchain of the full node in a case that the verification result indicates a successful verification, take the acquired block as a target block, and take a block header of the target block as a first block header.

The specific implementations of the signature information receiving unit 1001, the signature information verification unit 1002 and the target block determining unit 1003 may be seen from the description about S202 in the embodiment corresponding to FIG. 8, and will not be described in detail herein.

The initial execution result determining module 200 is configured to acquire an MPT in the target block, and execute a transaction service corresponding to the transaction-to-be-verified based on the MPT in the target block to obtain an initial transaction execution result, a state read set and a state write set corresponding to the transaction service.

The initial execution result determining module 200 includes: a first state data determining unit 2001, a second state data determining unit 2002, a read set generation unit 2003, and a write set generation unit 2004.

The first state data determining unit 2001 is configured to acquire an MPT in the target block, take the acquired MPT as a pending tree, read state data associated with the transaction-to-be-verified from the pending tree, and take the read state data as first state data.

The second state data determining unit 2002 is configured to execute a transaction service corresponding to the transaction-to-be-verified based on the first state data, obtain an initial transaction execution result corresponding to the transaction service, record state data simulated to be written in a block following the target block in the process of executing the transaction service, and take the recorded state data as second state data.

The read set generation unit 2003 is configured to collect a first proof of existence of the first state data based on the pending tree, and generate a state read set based on the first proof of existence.

The write set generation unit 2004 is configured to collect a proof of modifiability and a second proof of existence of the second state data based on the pending tree, and generate a state write set based on the proof of modifiability and the second proof of existence.

The write set generation unit 2004 includes: a proof-of-modifiability acquisition sub-unit 20041, a proof-of-existence acquisition sub-unit 20042 and a write set generation sub-unit 20043.

The proof-of-modifiability acquisition sub-unit 20041 is configured to acquire a key string associated with the second state data before inserting the second state data into the pending tree, and acquire a proof of modifiability of the second state data based on the key string.

The pending tree includes a root node.

The proof-of-modifiability acquisition sub-unit 20041 is further configured to acquire a key string associated with the second state data before inserting the second state data into the pending tree; acquire a second node index relationship indicated by the pending tree, and traverse from the root node to search for a character having the same prefix as the key string based on the second node index relationship; and obtain a pending string based on all the characters found, acquire a proof of existence associated with the pending string, and take the acquired proof of existence as a proof of modifiability of the second state data.

The proof-of-existence acquisition sub-unit 20042 is configured to acquire a proof of existence of the second state data after inserting the second state data into the pending tree, and take the proof of existence of the second state data as a second proof of existence.

The write set generation sub-unit 20043 is configured to generate a state write set based on the proof of modifiability and the second proof of existence.

The specific implementations of the proof-of-modifiability acquisition sub-unit 20041, the proof-of-existence acquisition sub-unit 20042 and the write set generation sub-unit 20043 may be seen from the description about a state write set in the embodiment corresponding to FIG. 3, and will not be described in detail herein.

The specific implementations of the first state data determining unit 2001, the second state data determining unit 2002, the read set generation unit 2003, and the write set generation unit 2004 may be seen from the description about S208 in the embodiment corresponding to FIG. 8, and will not be described in detail herein.

The verification information determining module 300 is configured to acquire a block identifier in the first block header, take the initial transaction execution result, the state read set, the state write set, and the block identifier as transaction verification information corresponding to the transaction-to-be-verified for indicating a block generation node in the blockchain network, and check the legitimacy of the transaction-to-be-verified based on a first state snapshot in a second block header in a block header chain. The second block header is a block header matching the block identifier in the block header chain. The block generation node is an SPV node in the blockchain network.

The specific implementations of the target block determining module 100, the initial execution result determining module 200 and the verification information determining module 300 may be seen from the description about S201-S209 in the embodiment corresponding to FIG. 8, and will not be described in detail herein. In addition, beneficial effects achieved by using the same method are not described herein again.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 13:
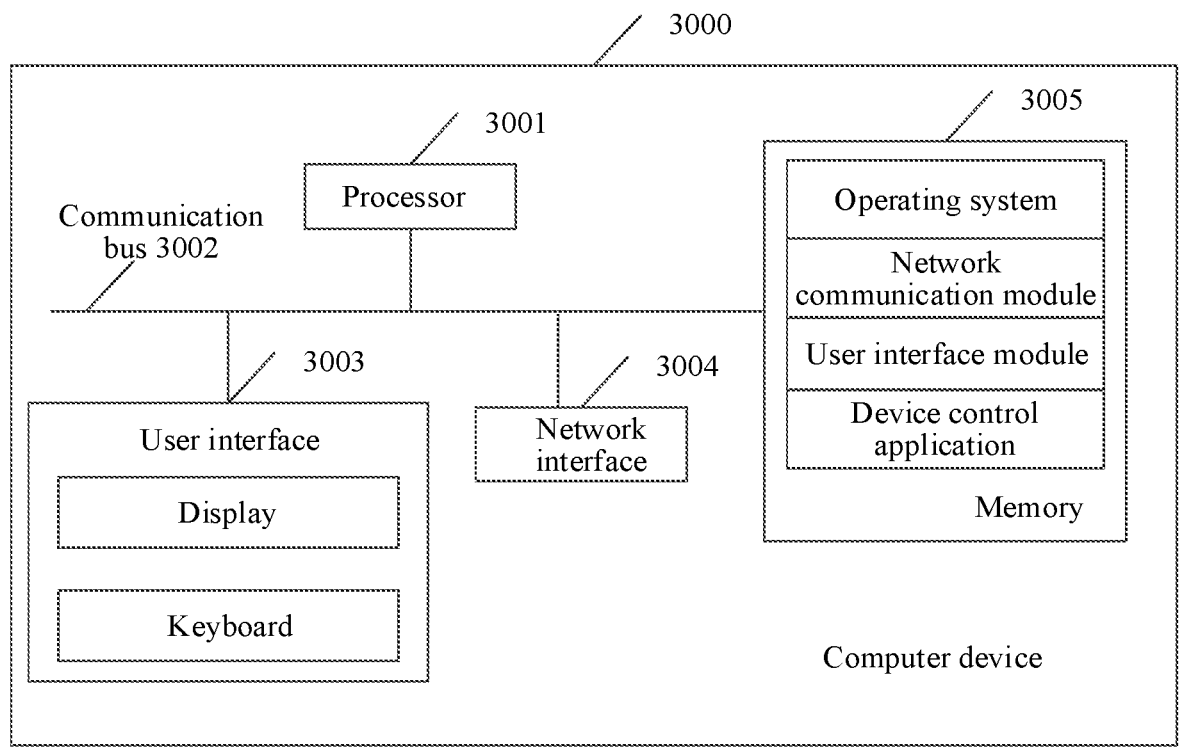
FIG. 13 is a schematic diagram of a computer device according to an embodiment of this disclosure.

Further, FIG. 13 is a schematic diagram of a computer device according to an embodiment of this disclosure. As shown in FIG. 13, the computer device 3000 may be the block generation node 20C in the embodiment corresponding to FIG. 2 and may include processing circuitry (e.g., at least one processor 3001 such as a CPU), at least one network interface 3004, a user interface 3003, a memory 3005, and at least one communication bus 3002. The communication bus 3002 is configured to implement connection and communication between the components. The user interface 3003 may include a display and a keyboard. In an example, the network interface 3004 may include a standard wired interface and a wireless interface (such as a WI-FI interface). The memory 3005 may be a high-speed RAM, or may be a non-volatile memory, such as, at least one magnetic disk memory. In an example, the memory 3005 may further be at least one storage apparatus located far away from the foregoing processor 3001. As shown FIG. 13, the memory 3005 used as a computer storage medium may include an operating system, a network communication module, a user interface module, and a device control application.

In the computer device 3000 shown in FIG. 13, the network interface 3004 is mainly configured to perform network communication. The user interface 3003 is mainly configured to provide an input interface for a user. The processor 3001 may be configured to invoke the device control application stored in the memory 3005.

It is to be understood that the computer device 3000 described in this embodiment of this disclosure may perform the descriptions of the transaction verification method in the foregoing embodiment corresponding to FIG. 3 or FIG. 8, or may perform the description of the transaction verification apparatus 1 in the foregoing embodiment corresponding to FIG. 11 or the description of the transaction verification apparatus 2 in the foregoing embodiment corresponding to FIG. 12. Details are not described herein again. In addition, beneficial effects achieved by using the same method are not described herein again.

In addition, it should be noted here that: an embodiment of this disclosure further provides a computer-readable storage medium (e.g., a non-transitory computer-readable storage medium), storing a computer program executed by the transaction verification apparatus 1 or the transaction verification apparatus 2 mentioned above. The computer program includes program instructions, when executing the program instructions, the processor can perform the descriptions of the transaction verification method in the foregoing embodiment corresponding to FIG. 3 or FIG. 8. Therefore, details are not described herein again. In addition, beneficial effects achieved by using the same method are not described herein again. For technical details that are not disclosed in the embodiments of the computer-readable storage medium of this disclosure, reference may be made to the descriptions of the method embodiments of this disclosure. As an example, the program instructions may be deployed to be executed on a computing device, or deployed to be executed on a plurality of computing devices at the same location, or deployed to be executed on a plurality of computing devices that are distributed in a plurality of locations and interconnected by using a communication network. The plurality of computing devices that are distributed in the plurality of locations and interconnected by using a communication network may form a blockchain system.

According to an aspect of this disclosure, a computer program product or a computer program is provided, including computer instructions, the computer instructions being stored in a computer-readable storage medium. A processor of a computer device reads the computer instructions from the computer-readable storage medium, and executes the computer instructions, causing the computer device to perform the descriptions of the transaction verification method in the foregoing embodiment corresponding to FIG. 3 or FIG. 8. Details are not described herein again. In addition, beneficial effects achieved by using the same method are not described herein again.

Figure 14:
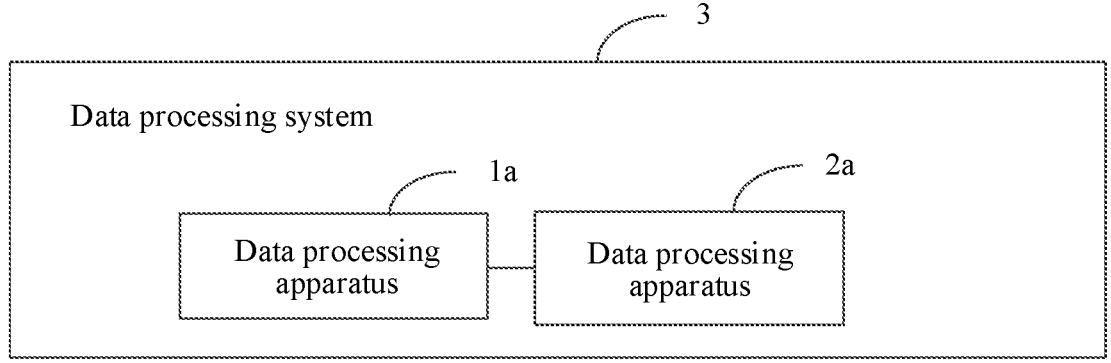
FIG. 14 is a schematic structural diagram of a data processing system according to an embodiment of this disclosure.

Further, FIG. 14 is a schematic structural diagram of a data processing system according to an embodiment of this disclosure. The data processing system 3 may include a data processing apparatus 1a and a data processing apparatus 2a.

The data processing apparatus 1a may be the transaction verification apparatus 1 in the embodiment corresponding to FIG. 11. It is to be understood that the data processing apparatus 1a may be integrated in the block generation node 20C in the embodiment corresponding to FIG. 2 and will therefore not be described in detail herein. The data processing apparatus 2a may be the transaction verification apparatus 2 in the embodiment corresponding to FIG. 12. It is to be understood that the data processing apparatus 2a may be integrated in the full node 20B in the embodiment corresponding to FIG. 2 and will therefore not be described in detail herein. In addition, beneficial effects achieved by using the same method are not described herein again. For technical details that are not disclosed in the embodiments of the data processing system of this disclosure, reference may be made to the descriptions of the method embodiments of this disclosure.

A person of ordinary skill in the art may understand that all or some of the procedures of the methods in the embodiments may be implemented by using a computer program instructing relevant hardware. The program may be stored in a computer-readable storage medium. When the program is executed, the procedures of the foregoing method embodiments may be performed. The storage medium may be a magnetic disc, an optical disc, a read-only memory (ROM), a random access memory (RAM), or the like.

The foregoing disclosure is merely exemplary embodiments of this disclosure, and are not intended to limit the scope of the claims of this disclosure. Therefore, equivalent variations made in accordance with the claims of this disclosure shall fall within the scope of this disclosure.

The invention claimed is:

1. A transaction verification method performed by a light node in a blockchain network, the method comprising:
acquiring a to-be-verified transaction transmitted by a user node in the blockchain network and transaction verification information corresponding to the to-be-verified transaction, the transaction verification information being determined by a full node in the blockchain network by executing a transaction service corresponding to the to-be-verified transaction, the transaction verification information including a state read set that includes state data associated with the to-be-verified transaction, a state write set that includes state data associated with the executed transaction service, an initial transaction execution result of the executed transaction service, and a block identifier of a target block with a maximum generation timestamp on a full blockchain of the full node, a first block header of the target block including the block identifier, the maximum generation timestamp indicating that the target block is a latest generated block in the full blockchain;
determining a second block header from a block header chain of the light node in the blockchain network, the second block header being matched with the block identifier in the first block header, and checking the state read set and the state write set based on a first state snapshot in the second block header to obtain a first check result of the to-be-verified transaction;
in response to the first check result indicating that both a first proof check result based on the state read set and a second proof check result based on the state write set are successful, executing the transaction service based on the state read set in response to the first check result indicating that the state read set and the state write set are verified to obtain a target transaction execution result corresponding to the transaction service and to-be-written state data, the first proof check result indicating (i) a first comparison between a hash pointer of a root node and a node hash of a child node of the root node in the target block and (ii) a second comparison between a node hash of the root node and the first state snapshot, the second proof check result being configured to check a proof of modifiability based on the first state snapshot;
and checking legitimacy of the to-be-verified transaction based on the initial transaction execution result, the target transaction execution result, the state write set, and the to-be-written state data.

2. The method according to claim 1, wherein the state read set and the state write set are generated by the full node based on a Merkle Patricia tree (MPT) in the target block; and
the determining the second block header comprises:
determining a state snapshot in the second block header as the first state snapshot in the second block header;
acquiring a first proof of existence of first state data from the state read set, and checking the first proof of existence based on the first state snapshot to obtain the first proof check result, the first state data being state data obtained by the full node from the MPT of the target block and associated with the to-be-verified transaction;
acquiring a proof of modifiability of second state data from the state write set, and checking the proof of modifiability based on the first state snapshot to obtain the second proof check result, the second state data being state data that is recorded by the full node when the full node simulates to execute the transaction service and written in a block subsequent to the target block; and
determining the first check result of the to-be-verified transaction based on the first proof check result and the second proof check result.

3. The method according to claim 2, wherein
the acquiring the first proof of existence of the first state data from the state read set, and checking the first proof of existence based on the first state snapshot to obtain the first proof check result comprises:
acquiring the first proof of existence of the first state data that is a node path acquired by the full node from the MPT in the target block and associated with the first state data, the node path including a leaf node for storing the first state data, and the root node;
setting the leaf node as the child node and setting a node preceding the leaf node as a parent node corresponding to the child node based on a first node index relationship indicated by the node path, and comparing a hash value of the child node with a hash pointer of the parent node to obtain an initial comparison result;
in response to the initial comparison result indicating that the hash value being consistent with the hash pointer, updating the child node and the parent node based on the first node index relationship, and obtaining a first comparison result of the first proof of existence when the updated parent node is the root node;
comparing a hash value of the root node with the first state snapshot to obtain a second comparison result of the first proof of existence; and
obtaining the first proof check result based on the first comparison result and the second comparison result.

4. The method according to claim 1, wherein the checking the legitimacy of the to-be-verified transaction comprises:

comparing the initial transaction execution result with the target transaction execution result to obtain a third comparison result;

acquiring a second proof of existence of second state data from the state write set, and checking the second proof of existence based on the first state snapshot;

in response to the second proof of existence being verified, comparing the second state data with the to-be-written state data to obtain a fourth comparison result; and obtaining a second check result of the to-be-verified transaction based on the third comparison result and the fourth comparison result, and checking the legitimacy of the to-be-verified transaction based on the second check result.

5. The method according to claim 1, further comprising:

generating, based on second state data in the state write set, a second state snapshot associated with the second state data in response to the legitimacy of the to-be-verified transaction being verified;

generating a to-be-processed block header based on the to-be-verified transaction, the target transaction execution result and the second state snapshot, the to-be-processed block header being applied as a block header subsequent to the second block header; and writing the to-be-processed block header in the block header chain.

6. The method according to claim 5, further comprising:

in response to the to-be-processed block header being written in the block header chain, acquiring a node public key of the full node, and encrypting the to-be-processed block header to obtain encrypted data information; and transmitting the encrypted data information to the full node such that the full node decrypts the encrypted data information based on a node private key of the full node to obtain the to-be-processed block header.

7. The method according to claim 1, wherein the block identifier includes one of a block height and a hash value of the target block.

8. An apparatus for transaction verification, comprising: processing circuitry configured to acquire a to-be-verified transaction transmitted by a user node in a blockchain network and transaction verification information corresponding to the to-be-verified transaction, the transaction verification information being determined by a full node in the blockchain network by executing a transaction service corresponding to the to-be-verified transaction, the transaction verification information including a state read set that includes state data associated with the to-be-verified transaction, a state write set that includes state data associated with the executed transaction service, an initial transaction execution result of the executed transaction service, and a block identifier of a target block with a maximum generation timestamp on a full blockchain of the full node, a first block header of the target block including the block identifier, the maximum generation timestamp indicating that the target block is a latest generated block in the full blockchain;

determine a second block header from a block header chain of a light node in the blockchain network, the second block header being matched with the block identifier in the first block header, and checking the state read set and the state write set based on a first state snapshot in the second block header to obtain a first check result of the to-be-verified transaction;

in response to the first check result indicating that both a first proof check result based on the state read set and a second proof check result based on the state write set are successful, execute the transaction service based on the state read set in response to the first check result indicating that the state read set and the state write set are verified to obtain a target transaction execution result corresponding to the transaction service and to-be-written state data, the first proof check result indicating (i) a first comparison between a hash pointer of a root node and a node hash of a child node of the root node in the target block and (ii) a second comparison between a node hash of the root node and the first state snapshot, the second proof check result being configured to check a proof of modifiability based on the first state snapshot;

and check legitimacy of the to-be-verified transaction based on the initial transaction execution result, the target transaction execution result, the state write set, and the to-be-written state data.

9. The apparatus according to claim 8, wherein the state read set and the state write set are generated by the full node based on a Merkle Patricia tree (MPT) in the target block; and the processing circuitry is configured to:

determine a state snapshot in the second block header as the first state snapshot in the second block header;

acquire a first proof of existence of first state data from the state read set, and check the first proof of existence based on the first state snapshot to obtain the first proof check result, the first state data being state data obtained by the full node from the MPT of the target block and associated with the to-be-verified transaction;

acquire a proof of modifiability of second state data from the state write set, and check the proof of modifiability based on the first state snapshot to obtain the second proof check result, the second state data being state data that is recorded by the full node when the full node simulates to execute the transaction service and written in a block subsequent to the target block; and determine the first check result of the to-be-verified transaction based on the first proof check result and the second proof check result.

10. The apparatus according to claim 9, wherein the processing circuitry is configured to:

acquire the first proof of existence of the first state data that is a node path acquired by the full node from the MPT in the target block and associated with the first state data, the node path including a leaf node for storing the first state data, and the root node;

set the leaf node as the child node and setting a node preceding the leaf node as a parent node corresponding to the child node based on a first node index relationship indicated by the node path, and compare a hash value of the child node with a hash pointer of the parent node to obtain an initial comparison result;

in response to the initial comparison result indicating that the hash value being consistent with the hash pointer, update the child node and the parent node based on the first node index relationship, and obtain a first comparison result of the first proof of existence when the updated parent node is the root node;

compare a hash value of the root node with the first state snapshot to obtain a second comparison result of the first proof of existence; and obtain the first proof check result based on the first comparison result and the second comparison result.

11. The apparatus according to claim 8, the processing circuitry is configured to:
   compare the initial transaction execution result with the target transaction execution result to obtain a third comparison result;
   acquire a second proof of existence of second state data from the state write set, and checking the second proof of existence based on the first state snapshot;
   in response to the second proof of existence being verified, compare the second state data with the to-be-written state data to obtain a fourth comparison result; and
   obtain a second check result of the to-be-verified transaction based on the third comparison result and the fourth comparison result, and check the legitimacy of the to-be-verified transaction based on the second check result.

12. The apparatus according to claim 8, the processing circuitry is configured to:
   generate, based on second state data in the state write set, a second state snapshot associated with the second state data in response to the legitimacy of the to-be-verified transaction being verified;
   generate a to-be-processed block header based on the to-be-verified transaction, the target transaction execution result and the second state snapshot, the to-be-processed block header being applied as a block header subsequent to the second block header; and
   write the to-be-processed block header in the block header chain.

13. The apparatus according to claim 12, the processing circuitry is configured to:
   in response to the to-be-processed block header being written in the block header chain, acquire a node public key of the full node, and encrypt the to-be-processed block header to obtain encrypted data information; and
   transmit the encrypted data information to the full node such that the full node decrypts the encrypted data information based on a node private key of the full node to obtain the to-be-processed block header.

14. The apparatus according to claim 8, wherein the block identifier includes one of a block height and a hash value of the target block.

15. A non-transitory computer-readable storage medium storing instructions which when executed by a processor of a light node in a blockchain network cause the processor to perform:
   acquiring a to-be-verified transaction transmitted by a user node in the blockchain network and transaction verification information corresponding to the to-be-verified transaction, the transaction verification information being determined by a full node in the blockchain network by executing a transaction service corresponding to the to-be-verified transaction, the transaction verification information including a state read set that includes state data associated with the to-be-verified transaction, a state write set that includes state data associated with the executed transaction service, an initial transaction execution result of the executed transaction service, and a block identifier of a target block with a maximum generation timestamp on a full blockchain of the full node, a first block header of the target block including the block identifier, the maximum generation timestamp indicating that the target block is a latest generated block in the full blockchain;
   determining a second block header from a block header chain of the light node in the blockchain network, the second block header being matched with the block identifier in the first block header, and checking the state read set and the state write set based on a first state snapshot in the second block header to obtain a first check result of the to-be-verified transaction;
   in response to the first check result indicating that both a first proof check result based on the state read set and a second proof check result based on the state write set are successful, executing the transaction service based on the state read set to obtain a target transaction execution result corresponding to the transaction service and to-be-written state data, the first proof check result indicating (i) a first comparison between a hash pointer of a root node and a node hash of a child node of the root node in the target block and (ii) a second comparison between a node hash of the root node and the first state snapshot, the second proof check result being configured to check a proof of modifiability based on the first state snapshot; and
   checking legitimacy of the to-be-verified transaction based on the initial transaction execution result, the target transaction execution result, the state write set, and the to-be-written state data.

16. The non-transitory computer-readable storage medium according to claim 15, wherein the state read set and the state write set are generated by the full node based on a Merkle Patricia tree (MPT) in the target block; and
   the determining the second block header comprises:
   determining a state snapshot in the second block header as the first state snapshot in the second block header;
   acquiring a first proof of existence of first state data from the state read set, and checking the first proof of existence based on the first state snapshot to obtain the first proof check result, the first state data being state data obtained by the full node from the MPT of the target block and associated with the to-be-verified transaction;
   acquiring a proof of modifiability of second state data from the state write set, and checking the proof of modifiability based on the first state snapshot to obtain the second proof check result, the second state data being state data that is recorded by the full node when the full node simulates to execute the transaction service and written in a block subsequent to the target block; and
   determining the first check result of the to-be-verified transaction based on the first proof check result and the second proof check result.

17. The non-transitory computer-readable storage medium according to claim 16, wherein
   the acquiring the first proof of existence of the first state data from the state read set, and checking the first proof of existence based on the first state snapshot to obtain the first proof check result comprises:
   acquiring the first proof of existence of the first state data that is a node path acquired by the full node from the MPT in the target block and associated with the first state data, the node path including a leaf node for storing the first state data, and the root node;
   setting the leaf node as the child node and setting a node preceding the leaf node as a parent node corresponding to the child node based on a first node index relationship indicated by the node path, and comparing a hash value of the child node with a hash pointer of the parent node to obtain an initial comparison result;

in response to the initial comparison result indicating that the hash value being consistent with the hash pointer, updating the child node and the parent node based on the first node index relationship, and obtaining a first comparison result of the first proof of existence when the updated parent node is the root node;

comparing a hash value of the root node with the first state snapshot to obtain a second comparison result of the first proof of existence; and obtaining the first proof check result based on the first comparison result and the second comparison result.

18. The non-transitory computer-readable storage medium according to claim 15, wherein the checking the legitimacy of the to-be-verified transaction comprises:

comparing the initial transaction execution result with the target transaction execution result to obtain a third comparison result;

acquiring a second proof of existence of second state data from the state write set, and checking the second proof of existence based on the first state snapshot;

in response to the second proof of existence being verified, comparing the second state data with the to-be-written state data to obtain a fourth comparison result; and obtaining a second check result of the to-be-verified transaction based on the third comparison result and the fourth comparison result, and checking the legitimacy of the to-be-verified transaction based on the second check result.

19. The non-transitory computer-readable storage medium according to claim 15, wherein the instructions when executed by the processor further cause the processor to perform:

generating, based on second state data in the state write set, a second state snapshot associated with the second state data in response to the legitimacy of the to-be-verified transaction being verified;

generating a to-be-processed block header based on the to-be-verified transaction, the target transaction execution result and the second state snapshot, the to-be-processed block header being applied as a block header subsequent to the second block header; and writing the to-be-processed block header in the block header chain.

20. The non-transitory computer-readable storage medium according to claim 19, wherein the instructions when executed by the processor further cause the processor to perform:

in response to the to-be-processed block header being written in the block header chain, acquiring a node public key of the full node, and encrypting the to-be-processed block header to obtain encrypted data information; and transmitting the encrypted data information to the full node such that the full node decrypts the encrypted data information based on a node private key of the full node to obtain the to-be-processed block header.

* * * * *